(12) United States Patent
Sato et al.

(10) Patent No.: US 12,472,470 B2
(45) Date of Patent: Nov. 18, 2025

(54) OXYGENATOR AND METHOD FOR MANUFACTURING SAME

(71) Applicant: TERUMO KABUSHIKI KAISHA, Tokyo (JP)

(72) Inventors: Takeshi Sato, Kanagawa (JP); Renjo Takama, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 667 days.

(21) Appl. No.: 17/882,937

(22) Filed: Aug. 8, 2022

(65) Prior Publication Data

US 2023/0001358 A1 Jan. 5, 2023

Related U.S. Application Data

(63) Continuation of application No. PCT/JP2021/006812, filed on Feb. 24, 2021.

(30) Foreign Application Priority Data

Mar. 2, 2020 (JP) ................................. 2020-035292

(51) Int. Cl.
*B01D 53/22* (2006.01)
*A61M 1/16* (2006.01)
(Continued)

(52) U.S. Cl.
CPC ........... *B01D 67/0088* (2013.01); *A61M 1/16* (2013.01); *B01D 63/031* (2022.08); *B01D 63/04* (2013.01);
(Continued)

(58) Field of Classification Search
CPC .............. B01D 67/0088; B01D 71/701; B01D 63/031; B01D 71/262; B01D 71/261;
(Continued)

(56) References Cited

U.S. PATENT DOCUMENTS 4,948,560 A * 8/1990 Deguchi ............. A61M 1/1698
210/321.89
5,236,665 A * 8/1993 Mathewson ........ A61M 1/1629
210/499

(Continued)

FOREIGN PATENT DOCUMENTS

| JP | S57180405 A | 11/1982 |
|---|---|---|
| JP | S5944267 A | 3/1984 |
| JP | 2002035116 A | 2/2002 |

OTHER PUBLICATIONS

International Search Report, PCT/JP2021/006812, Apr. 22, 2021.
International Preliminary Opinion, PCT/JP2021/006812, May 11, 2021.

*Primary Examiner* — Anthony R Shumate
(74) *Attorney, Agent, or Firm* — MacMillan, Sobanski & Todd, LLC

(57) ABSTRACT

An oxygenator having a plurality of porous hollow fiber membranes for gas exchange to treat blood is manufactured by dissolving a silicone compound in an organic solvent having a surface tension of less than 70 dyn/cm to prepare a coating solution, and bringing an inner surface of the hollow fiber membranes into contact with the coating solution under a negative pressure of 50 hPa or more and 150 hPa or less to form a silicone compound-containing coating layer on the inner surface. An antithrombotic polymer compound-containing coat can be provided directly on an outer surface of the hollow fiber membranes.

10 Claims, 10 Drawing Sheets

(51) Int. Cl.
    *B01D 63/02*     (2006.01)
    *B01D 63/04*     (2006.01)
    *B01D 67/00*     (2006.01)
    *B01D 71/26*     (2006.01)
    *B01D 71/70*     (2006.01)

(52) U.S. Cl.
    CPC ....... *B01D 67/0095* (2013.01); *B01D 71/261* (2022.08); *B01D 71/262* (2022.08); *B01D 71/701* (2022.08); *A61M 2207/10* (2013.01)

(58) Field of Classification Search
    CPC ...... B01D 63/04; B01D 67/0095; A61M 1/16; A61M 2207/10
    See application file for complete search history.

(56) References Cited

U.S. PATENT DOCUMENTS

| | | | | |
|---|---|---|---|---|
| 11,376,413 | B2* | 7/2022 | Gartner | A61M 60/117 |
| 11,471,575 | B2* | 10/2022 | Gyoten | A61M 60/113 |
| 11,534,536 | B2* | 12/2022 | Gyoten | A61M 1/1698 |
| 2007/0166189 | A1* | 7/2007 | Ogihara | A61M 1/3623 422/45 |
| 2011/0284116 | A1* | 11/2011 | Donnelly | B29C 53/582 156/143 |
| 2014/0030146 | A1* | 1/2014 | Takeuchi | B01D 71/261 422/46 |
| 2014/0030149 | A1* | 1/2014 | Takeuchi | A61M 1/3623 422/48 |
| 2016/0287776 | A1* | 10/2016 | Hyde | A61M 1/327 |
| 2017/0320053 | A1* | 11/2017 | Moon | B01J 47/016 |
| 2018/0036459 | A1* | 2/2018 | Anzai | B01D 71/262 |
| 2018/0036468 | A1 | 2/2018 | Anzai et al. | |
| 2019/0175811 | A1* | 6/2019 | Gyoten | B01D 69/08 |
| 2020/0330669 | A1* | 10/2020 | Kido | A61M 1/1645 |
| 2021/0015985 | A1* | 1/2021 | Oda | A61M 1/1664 |
| 2023/0398495 | A1* | 12/2023 | Takama | B01D 63/02 |
| 2023/0398501 | A1* | 12/2023 | Sato | B01D 65/102 |
| 2024/0416289 | A1* | 12/2024 | Bretherton-Liu | B01D 69/1214 |

\* cited by examiner

OXYGENATOR AND METHOD FOR MANUFACTURING SAME

CROSS REFERENCE TO RELATED APPLICATIONS

This application is a continuation of PCT Application No. PCT/JP2021/006812, filed Feb. 24, 2021, based on and claiming priority to Japanese Application No. JP2020-035292, filed Mar. 2, 2020, both of which are incorporated herein by reference in their entirety.

BACKGROUND OF THE INVENTION

The present invention relates to an oxygenator and a method for manufacturing the same.

An oxygenator including porous hollow fiber membranes may have a decrease in gas exchange performance with long-term use. Wet lung and plasma leakage are main factors of the decrease in performance. It is possible to recover the gas exchange performance of a wet lung by blowing air at high pressure to remove dew condensation from hollow fiber membranes. In contrast, plasma leakage causes an irreversible decrease in performance of an oxygenator. Finding a solution to the problem caused by plasma leakage is a requirement for long-term use of oxygenators, and many studies have been made so far. In order to improve anti-plasma leakage properties, the following approaches have been employed in the studies: an approach for closing micropores in hollow fiber membranes, and an approach for making micropores in hollow fiber membranes ultrafine.

For example, according to JP 2002-035116A, a silicone coating applied to an outer surface of polypropylene porous hollow fiber membranes reduces the chance of plasma leakage and enables long-term use.

However, in the technique disclosed in JP 2002-035116A, the silicone coating is applied by moving a continuous line of the hollow fiber membranes at a rate of 0.5 to 50 m/min in a silicone monomer gas during plasma discharge in a high vacuum and by polymerizing silicone monomers on the outer surface of the hollow fiber membranes. For this reason, the coating in this technique requires intricate equipment and long periods of time.

SUMMARY OF THE INVENTION

An object of the invention is to provide an oxygenator having anti-plasma leakage properties by a simpler technique.

The inventors have found that bringing a coating solution prepared by dissolving a silicone compound in a specific organic solvent into contact with an inner surface of hollow fiber membranes under a specific negative pressure makes it possible to form a silicone compound-containing coating layer on the inner surface.

In other words, the object is achieved by the following method for manufacturing an oxygenator having a plurality of porous hollow fiber membranes for gas exchange, the method involving: dissolving a silicone compound in an organic solvent having a surface tension of less than 70 dyn/cm to prepare a coating solution; and bringing an inner surface of the hollow fiber membranes into contact with the coating solution under a negative pressure of 50 hPa or more and 150 hPa or less to form a silicone compound-containing coating layer on the inner surface.

The object is also achieved by an oxygenator having a plurality of porous hollow fiber membranes for gas exchange each of which has an inner surface that forms a lumen and an outer surface, in which the inner surface is provided with a silicone compound-containing coating layer, and the outer surface is provided with an antithrombotic polymer compound-containing coat.

DETAILED DESCRIPTION OF PREFERRED EMBODIMENTS

Figure 1:
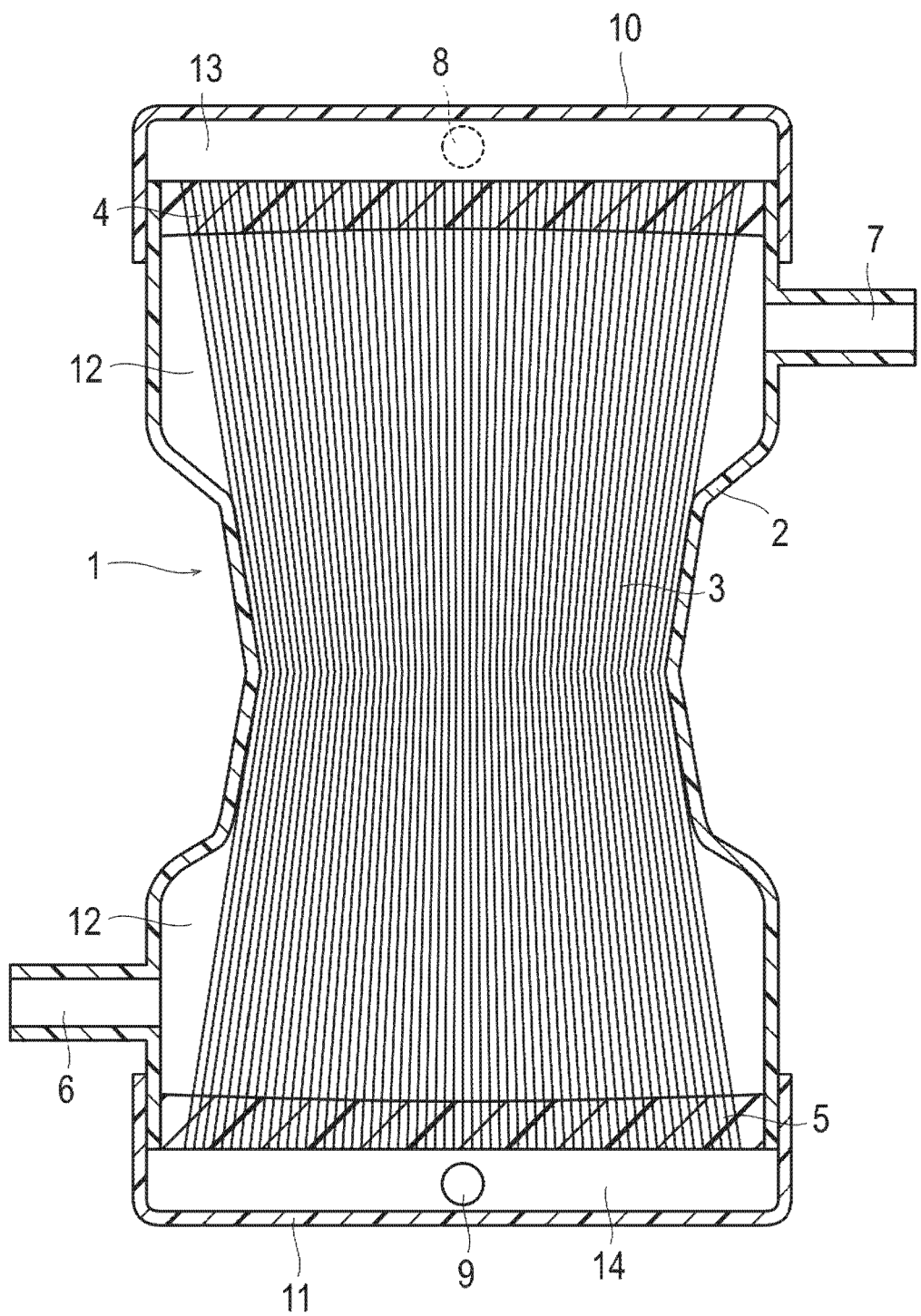
FIG. 1 is a cross-sectional view of a hollow fiber membrane-based oxygenator of external perfusion type according to an embodiment of the invention.

The invention relates to a method for manufacturing an oxygenator having a plurality of porous hollow fiber membranes for gas exchange, the method involving: dissolving a silicone compound in an organic solvent having a surface tension of less than 70 dyn/cm to prepare a coating solution; and bringing an inner surface of the hollow fiber membranes into contact with the coating solution under a negative pressure of 50 hPa or more and 150 hPa or less to form a coating layer containing a silicone compound (a silicone compound used for preparing the coating solution and/or a crosslinked product of the silicone compound) on the inner surface.

The method for manufacturing an oxygenator according to the invention offers an oxygenator having anti-plasma leakage properties by a technique simpler than one employed in the manufacturing method disclosed in JP 2002-035116A. The method according to the invention uses an organic solvent having a surface tension of less than 70 dyn/cm, which allows easy passage of a coating solution through lumina of hollow fiber membranes. However, the studies of the inventors have revealed that the coating solution is prone to leak to an outer surface of the hollow fiber membranes through pores of the hollow fiber membranes with a reduction in surface tension of the organic solvent. The inventors have also found that evacuating the lumina of the hollow fiber membranes to a negative pressure in a range of 50 hPa to 150 hPa not only prevents leakage of the coating solution but also successfully forms a silicone compound-containing coating layer on the inner surface.

In the manufacturing method disclosed in JP 2002-035116A, a silicone compound-containing coating layer is formed on an outer surface of hollow fiber membranes. In contrast, in the method according to the invention, a silicone compound-containing coating layer is formed on an inner surface of hollow fiber membranes. This makes it possible to simultaneously improve anti-plasma leakage properties by providing an oxygenator with a coat containing a water-soluble antithrombotic polymer compound (such as polymethoxyethyl acrylate (PMEA)). A coat containing a water-soluble antithrombotic polymer compound is typically formed in the following manner. The antithrombotic polymer compound is dispersed in an aqueous solvent containing water (preferably 85 mass % or more of water) to prepare an aqueous coating solution, and the coating solution is brought into contact with an inner surface or an outer surface of hollow fiber membranes. However, in a case where a silicone compound-containing coating layer is formed on the outer surface of the hollow fiber membranes by the manufacturing method disclosed in JP 2002-035116A, stacking the coat on top of the silicone compound-containing coating layer on the outer surface poses a challenge. The silicone compound-containing coating layer repels the aqueous coating solution due to its water repellency and inhibits the formation of the coat. Furthermore, in a case where the coat is formed on the inner surface where the silicone compound-containing coating layer is not formed, part of the silicone compound-containing coating layer on the outer surface is peeled off when the aqueous coating solution is allowed to pass through the lumina at a negative pressure. For these reasons, applying the technique of JP 2002-035116A to an oxygenator having a coating layer containing a water-soluble antithrombotic polymer compound does not ensure desired antithrombogenicity or anti-plasma leakage properties. According to the manufacturing method of the invention, a silicone compound-containing coating layer is formed on an inner surface of hollow fiber membranes, and a coat containing a water-soluble antithrombotic polymer compound is formed on an outer surface of the hollow fiber membranes. Therefore, it is possible to provide an oxygenator having both desired antithrombogenicity and anti-plasma leakage properties.

Hereinafter, preferred embodiments of the invention will be described. Note that the invention is not limited to the following embodiments. Furthermore, dimensional ratios of the drawings are exaggerated for illustration purpose and may differ from actual ratios.

Herein, "X to Y" represents a range including X and Y, indicating "X or more and Y or less". Unless otherwise specified, operations and measurements of physical properties and the like are performed at room temperature (20 to 25° C.) and at relative humidity of 40 to 50% RH. Furthermore, "A and/or B" indicates both A and B or either A or B.

Hereinafter, a method for manufacturing an oxygenator according to the invention will be described in detail. For convenience, an oxygenator obtained by the manufacturing method of the invention will be described first, and then, the manufacturing method of the invention will be described. Note that references in the oxygenator and references in the method for manufacturing an oxygenator are applicable to each other.

<Oxygenator>

An oxygenator according to an embodiment of the invention has a plurality of porous hollow fiber membranes for gas exchange each of which has an inner surface that forms a lumen and an outer surface. The inner surface is provided with a coating layer containing a silicone compound (a silicone compound used for preparing the coating solution and/or a crosslinked product of the silicone compound), and the outer surface is provided with a coat containing an antithrombotic polymer compound.

Details of the oxygenator according to the invention will now be described with reference to the drawings.

Figure 2:
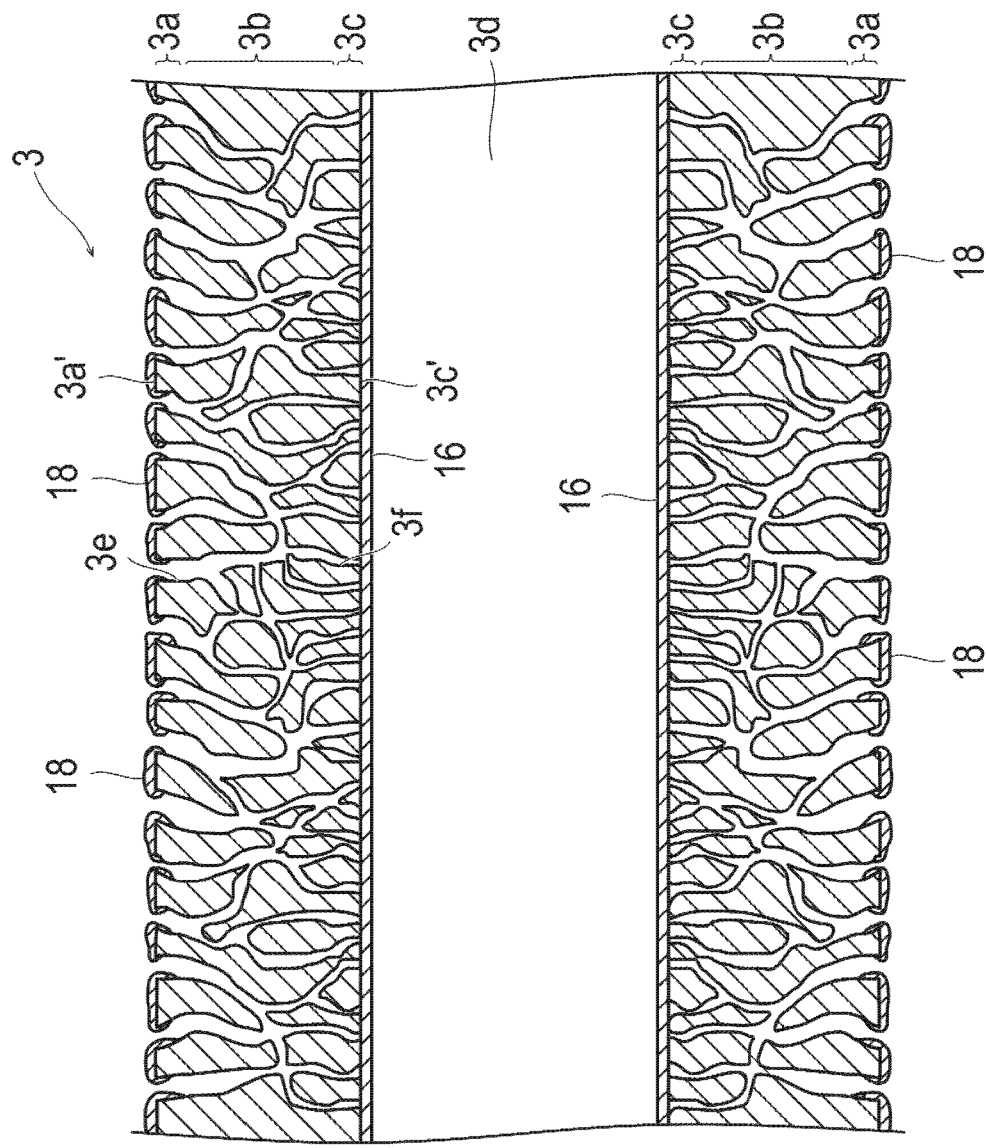
FIG. 2 is an enlarged cross-sectional view of a porous hollow fiber membrane for gas exchange used in the hollow fiber membrane-based oxygenator of external perfusion type according to the embodiment of the invention.

FIG. 1 is a cross-sectional view of a hollow fiber membrane-based oxygenator of external perfusion type according to an embodiment of the invention. FIG. 2 is an enlarged cross-sectional view of a porous hollow fiber membrane for gas exchange used in the hollow fiber membrane-based oxygenator of external perfusion type according to the embodiment of the invention. Herein, the hollow fiber membrane-based oxygenator of external perfusion type is simply referred to as "hollow fiber membrane-based oxygenator" or "oxygenator". Furthermore, the porous hollow fiber membranes for gas exchange is simply referred to herein as "porous hollow fiber membranes" or "hollow fiber membranes".

In the embodiment illustrated in FIG. 1, a hollow fiber membrane-based oxygenator of external perfusion type 1 includes a large number of porous hollow fiber membranes 3 for gas exchange placed in a housing 2. As illustrated in FIG. 2, the hollow fiber membranes 3 each include a passageway (lumen) 3d having a gas chamber at the center. In addition, the hollow fiber membranes 3 have openings 3e and 3f through which an outer surface 3a' and an inner surface 3c' of the hollow fiber membranes 3 communicate with each other. A coating layer 16 containing a silicone compound is formed on the inner surface 3c' of the hollow fiber membranes 3 through which an oxygen-containing gas flows. Furthermore, an antithrombotic polymer compound-containing coat 18 is formed on the outer surface 3a' (or the outer surface 3a' and an outer layer 3a) of the hollow fiber membranes 3 which comes into contact with blood (blood contact portion). The coating layer 16 may contain other components in addition to the silicone compound. Examples of the other components include, but are not particularly limited to, polyolefins, aliphatic hydrocarbons, inorganic fine particles, and crosslinkers. Preferably, the coating layer 16 comprises a silicone compound. Similarly, the coat 18 may contain other components in addition to the antithrombotic polymer compound. Examples of the other components include, but are not particularly limited to, other antithrombotic compounds (such as heparin), crosslinkers, thickeners, preservatives, and pH adjusters.

The silicone compound-containing coating layer 16 may be formed on at least part of the inner surface 3c' of the hollow fiber membranes 3 through which the oxygen-containing gas flows. However, from a perspective of maintaining gas exchange performance in long-term use (or from perspectives of improving anti-plasma leakage properties and suppressing wet lung), the coating layer 16 is preferably formed on the entire inner surface 3c'. In the embodiment illustrated in FIG. 2, the silicone compound-containing coating layer 16 is formed to close the opening 3f of each pore on the inner surface 3c' over the entire inner surface 3c', but the silicone compound-containing coating layer 16 has high gas permeability and has sufficient gas exchange performance. The silicone compound-containing coating layer 16 may also be formed on an inner layer 3c (or the inner layer 3c and a middle layer 3b according to circumstances) of the hollow fiber membranes 3.

Similarly, the antithrombotic polymer compound-containing coat 18 may be formed on at least part of the outer surface 3a' of the hollow fiber membranes 3 or the blood contact portion but is preferably formed on the entire outer surface 3a' from a perspective of antithrombotic biocompatibility (or from perspectives of suppressing and preventing adhesion/attachment of platelets and suppressing and preventing activation of platelets)). In the embodiment illustrated in FIG. 2, the antithrombotic polymer compound-containing coat 18 may be in the middle layer 3b of the hollow fiber membranes 3 (or the middle layer 3b and the inner layer 3c according to circumstances). However, it is preferable that the coat 18 is substantially not in the middle layer 3b of the hollow fiber membranes 3 (or the middle layer 3b and the inner layer 3c according to circumstances). Since the middle layer 3b or the inner layer 3c of the hollow fiber membranes 3 is substantially free from the antithrombotic polymer compound, hydrophobic properties of a base material contained in the middle layer 3b or the inner layer 3c are maintained, which prevents leakage of plasma components effectively. Herein, the expression "the antithrombotic polymer compound-containing coat 18 is substantially not in the middle layer 3b of the hollow fiber membranes 3 (or the middle layer 3b and the inner layer 3c according to circumstances)" indicates that penetration of the antithrombotic polymer compound is not observed around the inner surface 3c' of the hollow fiber membranes 3 (a surface on the side where the oxygen-containing gas flows). As will be described in a preferred embodiment of the method for manufacturing an oxygenator, a coat is formed by application of a colloid solution containing an antithrombotic polymer compound, whereby the antithrombotic polymer compound is substantially not in the middle layer 3b or the inner layer 3c of the hollow fiber membranes 3.

The hollow fiber membrane-based oxygenator 1 according to this embodiment is provided with the housing 2 including a blood inlet 6 and a blood outlet 7, a hollow fiber membrane bundle including a large number of porous hollow fiber membranes 3 for gas exchange placed in the housing 2, a pair of partitions 4 and 5 configured to hold both ends of the hollow fiber membrane bundle to the housing 2 in a liquid-tight manner, a blood chamber 12 formed between inner surfaces of the partitions 4, 5 and the housing 2 and the outer surface of the hollow fiber membranes 3, a gas chamber formed inside the hollow fiber membranes 3, and a gas inlet 8 and a gas outlet 9 that communicate with the gas chamber.

Specifically, the hollow fiber membrane-based oxygenator 1 according to this embodiment includes the housing 2 having a tubular shape, an aggregate of the hollow fiber membranes 3 for gas exchange housed in the tubular housing 2, and the partitions 4 and 5 that hold both ends of the hollow fiber membranes 3 placed in the housing 2 in a liquid-tight manner. The interior of the tubular housing 2 is partitioned into the blood chamber 12 as a first fluid chamber and the gas chamber as a second fluid chamber. The tubular housing 2 is provided with the blood inlet 6 and the blood outlet 7 that communicate with the blood chamber 12.

A gas inlet header 10 having a cap shape is attached to the top of the partition 4 or an end of the tubular housing 2. The gas inlet header 10 includes the gas inlet 8 or a second fluid inlet that communicates with the gas chamber or an internal space of the hollow fiber membranes 3. With such a configuration, an outer surface of the partition 4 and an inner surface of the gas inlet header 10 form a gas inlet chamber 13. This gas inlet chamber 13 communicates with the gas chamber formed by the internal space of the hollow fiber membranes 3.

Similarly, a gas outlet header 11 having a cap shape is attached to the bottom of the partition 5. The gas outlet header 11 includes the gas outlet 9 or a second fluid outlet that communicates with the internal space of the hollow fiber membranes 3. With such a configuration, an outer surface of the partition 5 and an inner surface of the gas outlet header 11 form a gas outlet chamber 14.

The hollow fiber membranes 3 are, but are not particularly limited to, porous membranes including a hydrophobic polymer material similar to hollow fiber membranes employed in a known oxygenator. Forming the hollow fiber membranes 3 (particularly, the inner surface 3c' of the hollow fiber membranes 3) with a hydrophobic polymer material suppresses leakage of plasma components. An example of a material used for porous membranes includes one similar to a hydrophobic polymer material included in hollow fiber membranes of a known oxygenator. Specific examples of the material include polyolefin resins such as polypropylene, polyethylene, and polymethylpentene and polymer materials such as polysulfone, polyacrylonitrile, polytetrafluoroethylene, and cellulose acetate. Among these examples, polyolefin resins are preferable, polypropylene and polymethylpentene are more preferable, and polypropylene is still more preferable. In other words, in a preferred embodiment of the invention, at least part of the hollow fiber membranes (preferably, all hollow fiber membranes) includes a polyolefin resin. In a more preferred embodiment of the invention, at least part of the hollow fiber membranes (preferably, all hollow fiber membranes) includes polypropylene or polymethylpentene.

The hollow fiber membranes 3 preferably have an inside diameter of 50 to 300 μm and more preferably 80 to 200 μm but are not particularly limited thereto. The hollow fiber membranes 3 preferably have an outside diameter of 100 to 400 μm and more preferably 130 to 200 μm but are not particularly limited thereto. The hollow fiber membranes 3 preferably have a thickness (membrane thickness) of 20 μm or more and less than 50 μm, more preferably 25 μm or more and less than 50 μm, still more preferably 25 to 45 μm, still more preferably 25 to 40 μm, still more preferably 25 to 35 μm, and particularly preferably 25 to 30 μm. Herein, the "thickness (membrane thickness)" of the hollow fiber membranes 3 indicates a thickness between the inner surface 3c' and the outer surface 3a' of the hollow fiber membranes 3, which is calculated by the Formula: [(outside diameter of hollow fiber membrane)−(inside diameter of hollow fiber membrane)]/2. With a minimum thickness falling within the above ranges, it is possible to sufficiently ensure the strength of the hollow fiber membranes 3. Furthermore, it is possible to satisfactorily save the trouble and cost during manufacturing, which is also preferable from a perspective of mass production. The hollow fiber membranes 3 preferably have a porosity of 5 to 90 vol. %, more preferably 10 to 80 vol. %, and particularly preferably 30 to 60 vol. %. The hollow fiber membranes 3 preferably have a pore size of 0.01 to 5 µm and more preferably 0.05 to 1 µm. A method for producing hollow fiber membranes is not particularly limited and may be similar to a known method for producing hollow fiber membranes or a modification of the known method. For example, hollow fiber membranes are preferably prepared by forming micropores in a wall by stretching or solid-liquid phase separation.

Herein, the "pore size" of the hollow fiber membranes 3 refers to an average diameter of openings on the side covered with the antithrombotic polymer compound (outer surface). Pore sizes of hollow fiber membranes can be measured by the following method.

First, a scanning electron microscope (SEM) is used to capture an image of one side (outer surface) of hollow fiber membranes covered with an antithrombotic polymer compound. Next, the obtained SEM image is subject to image processing, and pores (openings) are reassigned a pixel value for white and the other portions reassigned for black based on a threshold, and the number of pixels of the white portions is measured. The threshold for performing binarization may be set to an intermediate value between the whitest (brightest) portion and the blackest (darkest) portion before binarization.

The next step is to count the number of pixels of the pores (openings) displayed with white. Based on the number of pixels of the pores obtained in this manner and the resolution (µm/pixel) of the SEM image, pore areas are calculated. From the obtained pore areas, diameters of the pores are calculated assuming that the pores are circular, and a statistically significant number of pores, for example, 500 pores are randomly extracted. An arithmetic average diameter of the pores is referred to as the "pore size" of the hollow fiber membranes.

A material included in the tubular housing 2 may also be similar to one used for a housing of a known oxygenator. Specific examples of the material include hydrophobic synthetic resins such as polycarbonate, acryl-styrene copolymers, and acryl-butylene-styrene copolymers. The housing 2 is not particularly limited in shape and has, for example, a cylindrical shape and preferably has a transparent body. A transparent body makes it possible to check the inside of the housing 2 easily.

The quantity of the hollow fiber membranes 3 housed in this embodiment is not particularly limited and may be similar to that in a known oxygenator. For example, about 5,000 to 100,000 porous hollow fiber membranes 3 are axially placed in the housing 2 in parallel. Furthermore, the hollow fiber membranes 3 are fixed to both ends of the housing 2 in a liquid-tight state by the partitions 4 and 5 with both ends of the hollow fiber membranes 3 being opened. The partitions 4 and 5 are formed with a potting agent such as polyurethane and silicone rubber. A portion within the housing 2 sandwiched between the partitions 4 and 5 is partitioned into the gas chamber inside the hollow fiber membranes 3 and the blood chamber 12 outside the hollow fiber membranes 3.

In this embodiment, the gas inlet header 10 including the gas inlet 8 and the gas outlet header 11 including the gas outlet 9 are attached to the housing 2 in a liquid-tight manner. These headers 10 and 11 may be formed with any material, for example, a hydrophobic synthetic resin used for the housing 2. These headers 10 and 11 may be attached by any method. For example, the headers 10 and 11 are attached to the housing 2 by fusion using ultrasonic waves, high frequency, or induction heating, by adhesion using an adhesive, or by mechanical fitting. Alternatively, a fastening ring (not illustrated) may be used. The blood contact portion (an inner surface of the housing 2 or the outer surface 3a' of the hollow fiber membranes 3) of the hollow fiber membrane-based oxygenator 1 preferably consists of a hydrophobic material.

In this embodiment, a covering (coat or coating) containing an antithrombotic polymer compound is selectively formed on the outer surface 3a' of the hollow fiber membranes 3 (of external perfusion type). With such a configuration, blood (specifically, plasma components) hardly permeates or does not permeate the pores of the hollow fiber membranes 3. Accordingly, it is possible to effectively suppress and prevent leakage of blood (specifically, plasma components) from the hollow fiber membranes 3. Specifically, in a case where the antithrombotic polymer compound is substantially not in the middle layer 3b and the inner layer 3c of the hollow fiber membranes 3, it is possible to suppress and prevent leakage of high blood (specifically, plasma components) more effectively because materials of the middle layer 3b and the inner layer 3c of the hollow fiber membranes maintain a hydrophobic state. Accordingly, an oxygenator obtained by the method of the invention maintains high gas exchange performance over a long period of time.

The antithrombotic polymer compound-containing covering according to this embodiment is essentially formed on the outer surface 3a' of the hollow fiber membranes 3 of the oxygenator 1 but may be formed on other components (for example, the entire blood contact portion) in addition to the outer surface 3a'. With such a configuration, the oxygenator 1 is capable of suppressing and preventing adhesion/attachment and activation of platelets more effectively in the entire blood contact portion. Furthermore, such a configuration reduces a contact angle of the blood contact surface and facilitates priming. In this case, the antithrombotic polymer compound-containing covering according to the invention is preferably formed on other components to which blood comes into contact, but note that the hollow fiber membranes 3 other than the blood contact portion or other portions of the hollow fiber membranes 3 (for example, portions buried in the partitions 4 and 5) are not necessarily covered with the antithrombotic polymer compound. Since these portions do not come into contact with blood, it matters little if the portions are not covered with the antithrombotic polymer compound.

Figure 3:
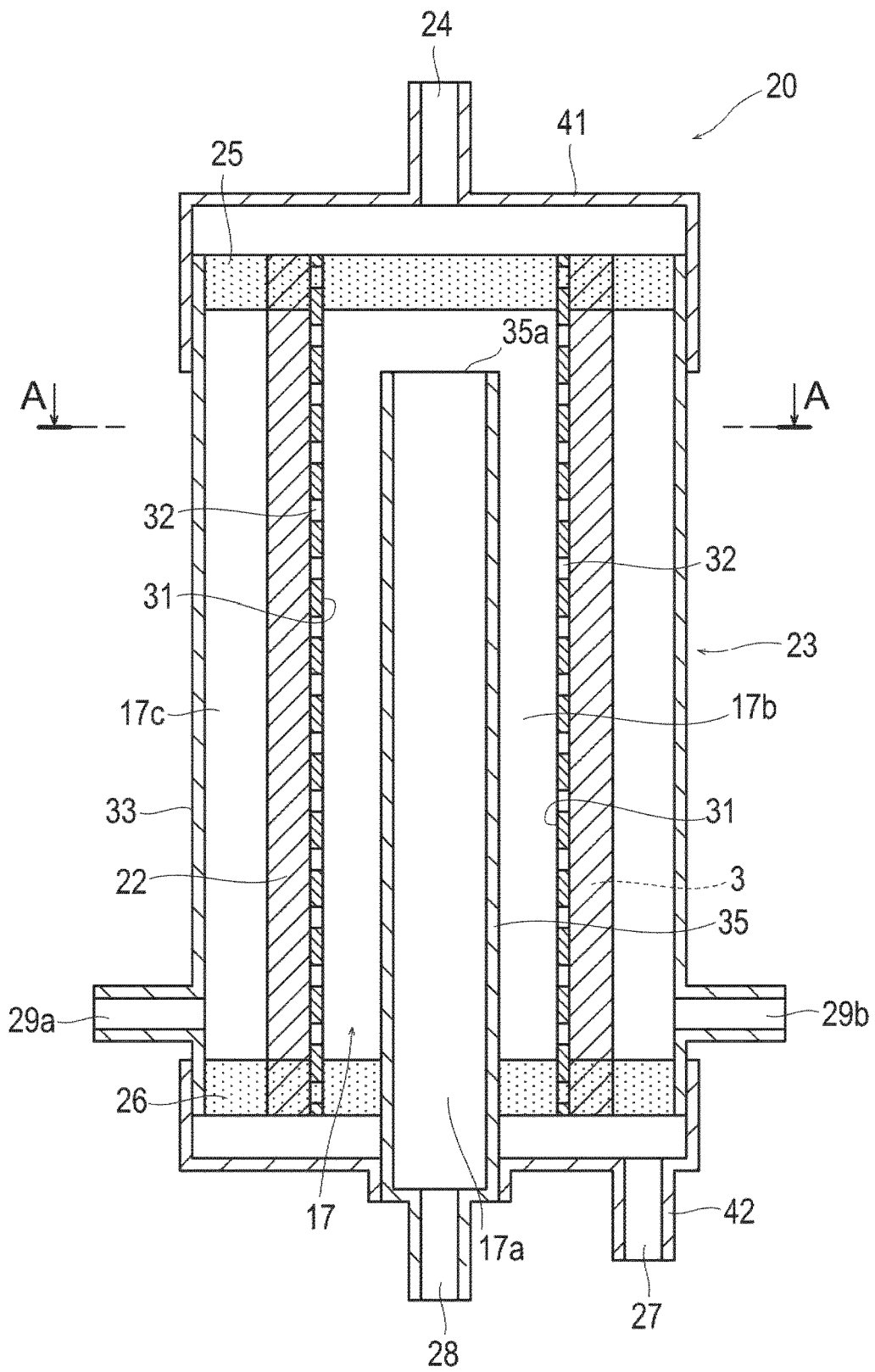
FIG. 3 is a cross-sectional view of a hollow fiber membrane-based oxygenator of external perfusion type according to another embodiment of the invention.
Figure 4:
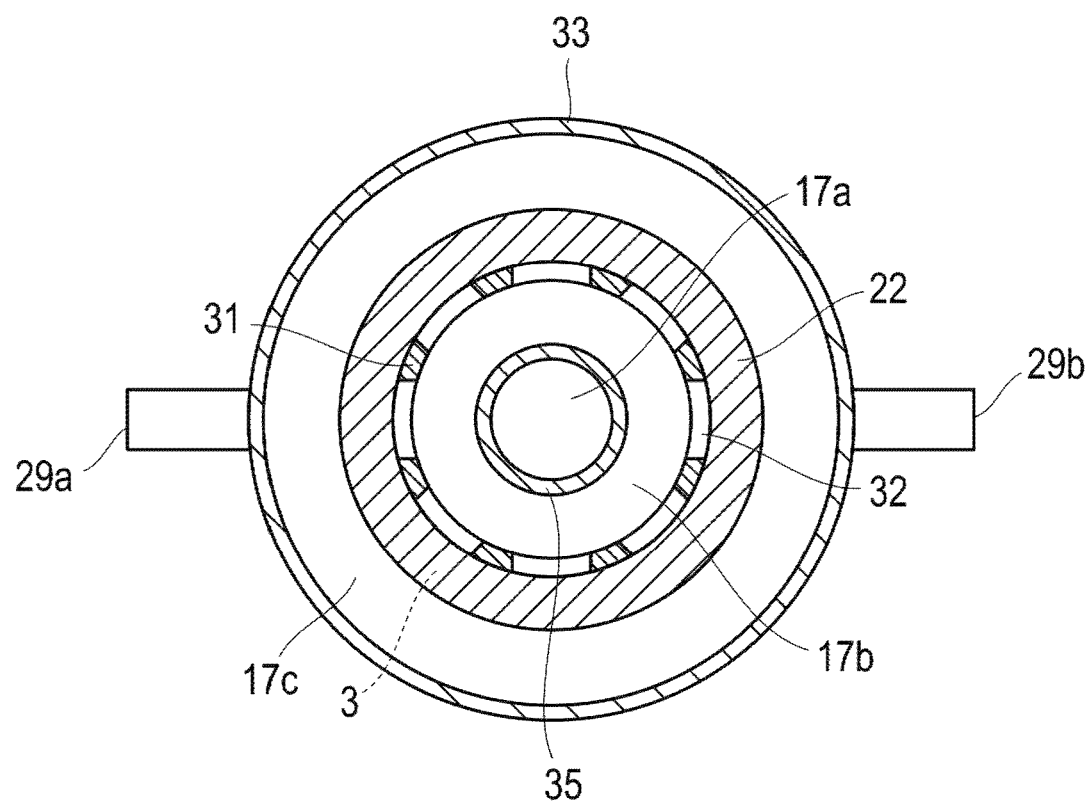
FIG. 4 is a cross-sectional view taken along line A-A of FIG. 3.

An oxygenator obtained by the method according to the invention may also be of the type illustrated in FIG. 3. FIG. 3 is a cross-sectional view illustrating another embodiment of an oxygenator obtained by the method according to the invention. FIG. 4 is a cross-sectional view taken along line A-A of FIG. 3.

In FIG. 3, an oxygenator (hollow fiber membrane-based oxygenator of external perfusion type) 20 includes an inner tube 31 having a side surface provided with openings 32 for blood circulation, a tubular hollow fiber membrane bundle 22 including a large number of porous hollow fiber membranes 3 for gas exchange and wound around an outer surface of the inner tube 31, a housing 23 that stores the tubular hollow fiber membrane bundle 22 together with the inner tube 31, partitions 25 and 26 that fix both ends of the tubular hollow fiber membrane bundle 22 to the housing 23 while both ends of the hollow fiber membranes 3 are opened, a blood inlet 28 and blood outlets 29 *a* and 29b that communicate with a blood chamber 17 formed in the housing 23, and a gas inlet 24 and a gas outlet 27 that communicate with the inside of the hollow fiber membranes 3.

In the oxygenator 20 according to this embodiment, as illustrated in FIGS. 3 and 4, the housing 23 includes an outer tube 33 for housing the inner tube 31, and the tubular hollow fiber membrane bundle 22 is placed between the inner tube 31 and the outer tube 33. Furthermore, the housing 23 is provided with one of the blood inlet 28 and blood outlets 29a and 29b which communicates with the inside of the inner tube 31 and the other of the blood inlet 28 and blood outlets 29a and 29b which communicates with the inside of the outer tube 33.

Specifically, the oxygenator 20 of this embodiment includes the housing 23 provided with an inner cannula 35 that is housed in the outer tube 33 and the inner tube 31 and has a distal end opened inside the inner tube 31. One end (the bottom) of the inner cannula 35 is provided with the blood inlet 28. The side surface of the outer tube 33 is provided with the two blood outlets 29a and 29b that stretch outward. The number of blood outlets may be one or more.

The tubular hollow fiber membrane bundle 22 is wound around the outer surface of the inner tube 31. In other words, the inner tube 31 is a core of the tubular hollow fiber membrane bundle 22. The inner cannula 35 housed in the inner tube 31 has the distal end opened near the first partition 25. Furthermore, the bottom of the inner cannula 35 protruded from the inner tube 31 is provided with the blood inlet 28.

The inner cannula 35, the inner tube 31 having the outer surface wound by the hollow fiber membrane bundle 22, and the outer tube 33 are substantially concentric. Due to the first partition 25, one end (upper end) of the inner tube 31 having the outer surface wound by the hollow fiber membrane bundle 22 and one end (upper end) of the outer tube 33 maintain concentric positions and are in a liquid-tight state so that the inside of the inner tube 31 and a space between the outer tube 33 and the outer surface of the hollow fiber membranes 3 do not communicate with the outside.

Furthermore, portions slightly upper than the blood inlet 28 of the inner cannula 35, that is, the other end (lower end) of the inner tube 31 having the outer surface wound by the hollow fiber membrane bundle 22 and the other end (lower end) of the outer tube 33, maintain concentric positions by the second partition 26 and are in a liquid-tight state so that a space between the inner cannula 35 and the inner tube 31 and a space between the outer tube 33 and the outer surface of the hollow fiber membranes 3 do not communicate with the outside. The partitions 25 and 26 are formed with a potting agent such as polyurethane or silicone rubber.

Accordingly, the oxygenator 20 of this embodiment includes a blood inlet 17a formed by the inside of the inner cannula 35, a first blood chamber 17b that is formed between the inner cannula 35 and the inner tube 31 and is substantially formed into a tubular space, and a second blood chamber 17c that is formed between the hollow fiber membrane bundle 22 and the outer tube 33 and is substantially formed into a tubular space. The blood inlet 17a, first blood chamber 17b, and second blood chamber 17c form the blood chamber 17.

The blood flowing in from the blood inlet 28 flows into the blood inlet 17a, rises within the inner cannula 35 (blood inlet 17a), flows out from an upper end 35a (opening end) of the inner cannula 35, flows into the first blood chamber 17b, passes through the openings 32 formed in the inner tube 31, and comes into contact with the hollow fiber membranes 3. After gas exchange, the blood flows into the second blood chamber 17c and flows out from the blood outlets 29a and 29b.

A gas inlet member 41 including the gas inlet 24 is fixed to one end of the outer tube 33. Similarly, a gas outlet member 42 including the gas outlet 27 is fixed to the other end of the outer tube 33. The blood inlet 28 of the inner cannula 35 penetrates the gas outlet member 42 and protrudes to the outside.

The outer tube 33 is not particularly limited in shape and may be shaped into, for example, a cylinder or polygonal tube, or a tube having an elliptical cross-section. A cylinder is preferable. The outer tube 33 is not particularly limited in inside diameter and may have a similar inside diameter to that of an outer tube used for a known oxygenator. However, a preferable inside diameter is about 32 to 164 mm. The outer tube 33 is not particularly limited in effective length (a range within the entire length which is not buried in the partitions 25 and 26) and may have a similar effective length to that of an outer tube used for a known oxygenator. However, a preferable effective length is about 10 to 730 mm.

The inner tube 31 is not particularly limited in shape and may be shaped into, for example, a cylinder, polygonal tube, or a tube having an elliptical cross-section. A cylinder is preferable. The inner tube 31 is not particularly limited in outside diameter and may have a similar outside diameter to that of an inner tube used for a known oxygenator. However, a preferable outside diameter is about 20 to 100 mm. The inner tube 31 is not particularly limited in effective length (a range within the entire length which is not buried in the partitions 25 and 26) and may have a similar effective length to that of an inner tube used for a known oxygenator. However, a preferable effective length is about 10 to 730 mm.

Figure 5:
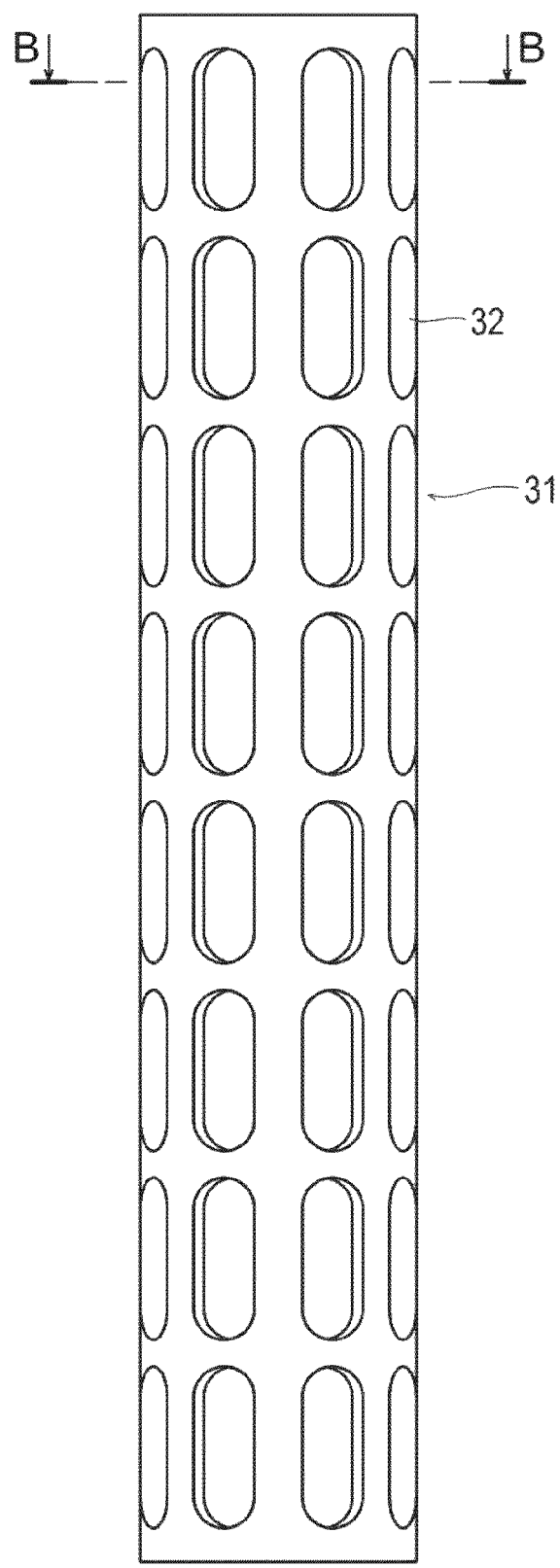
FIG. 5 is a front view illustrating an example of an inner tube used in the hollow fiber membrane-based oxygenator of external perfusion type according to the invention.
Figure 6:
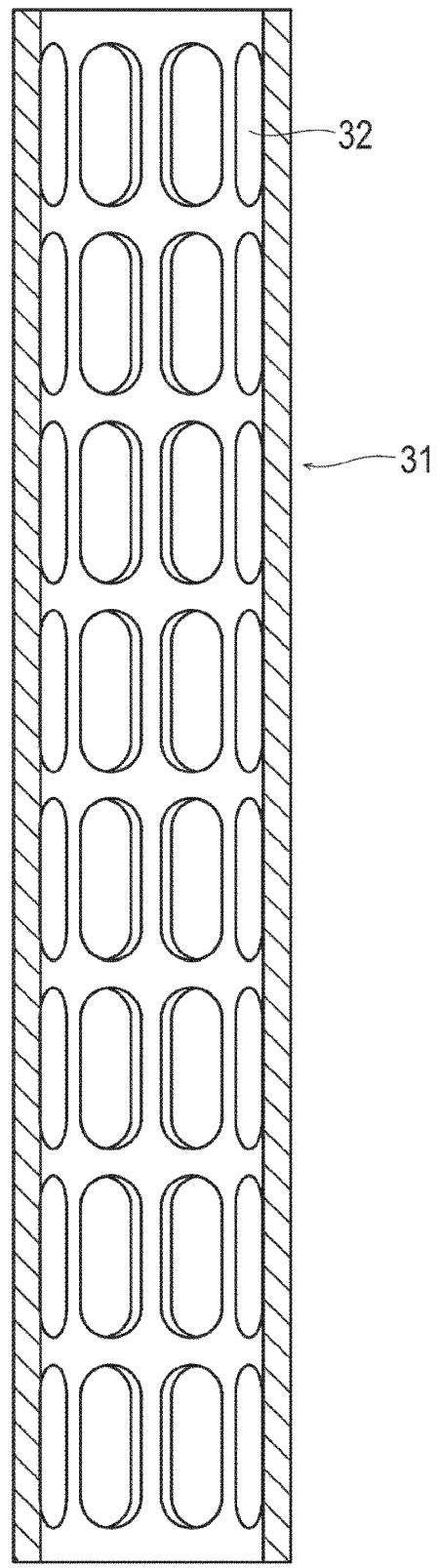
FIG. 6 is a central longitudinal sectional view of the inner tube illustrated in FIG. 5.
Figure 7:
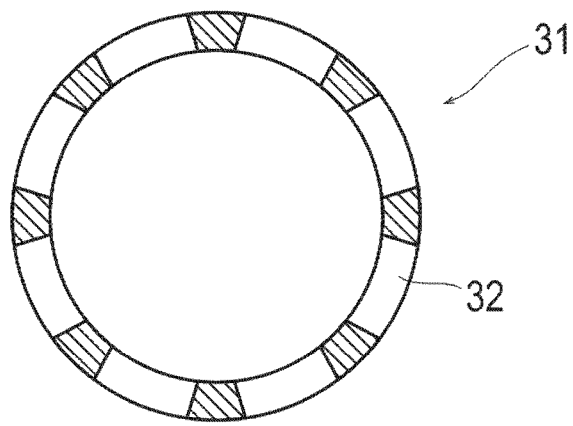
FIG. 7 is a cross-sectional view taken along line B-B of FIG. 5.

The inner tube 31 has the side surface provided with a large number of openings 32 for blood circulation. The openings 32 preferably have a large total area as long as required strength of the inner tube 31 is maintained. A preferred configuration that satisfies such a condition is illustrated in FIG. 5 (front view), FIG. 6 (central longitudinal sectional view of FIG. 5), and FIG. 7 (cross-sectional view taken along line B-B of FIG. 5). In this configuration, a plurality of (for example, 4 to 24) annular openings 32 (in the drawings, eight openings 32 in the longitudinal direction) is placed at regular intervals on the outer periphery of the inner tube 31, and a plurality of units of the openings 32 (in the drawings, eight units in the circumferential direction) is placed in the axial direction of the inner tube 31. Furthermore, the openings 32 may be shaped into a circle, polygon, or ellipse but are preferably shaped into an oval as illustrated in FIG. 5.

The inner cannula 35 is not particularly limited in shape and may be shaped into, for example, a cylinder or polygonal tube, or a tube having an elliptical cross-section. A cylinder is preferable. Furthermore, a distance between the distal opening of the inner cannula 35 and the first partition 25 is not particularly limited and may be similar to a distance employed in a known oxygenator. However, a preferable distance is about 20 to 50 mm. The inner cannula 35 is not particularly limited in inside diameter and may have a similar inside diameter to that of an inner tube used for a known oxygenator. However, a preferable inside diameter is about 10 to 30 mm.

The tubular hollow fiber membrane bundle 22 is not particularly limited in thickness and may have a thickness similar to that of a tubular hollow fiber membrane bundle used for a known oxygenator. However, the hollow fiber membrane bundle 22 preferably has a thickness of 5 to 35 mm and particularly preferably a thickness of 10 mm to 28 mm. Furthermore, the hollow fiber membranes 3 in the tubular space formed between the outer surface and the inner surface of the tubular hollow fiber membrane bundle 22 is not particularly limited in packing density and may be packed similarly to a known oxygenator. However, a preferable proportion of the hollow fiber membranes 3 is 40 to 85%, and a particularly preferable proportion is 45 to 80%. The tubular hollow fiber membrane bundle 22 may have an outside diameter similar to that of a hollow fiber membrane bundle used for a known oxygenator. However, the hollow fiber membrane bundle 22 preferably has an outside diameter of 30 to 170 mm, and more preferably an outside diameter of 70 mm to 130 mm. Such a configuration is employed as a gas exchange membrane.

The hollow fiber membrane bundle 22 is formed by winding hollow fiber membranes 3 around the inner tube 31. Specifically, a hollow fiber membrane bobbin is formed with the inner tube 31 as a core, both ends of the formed hollow fiber membrane bobbin are fixed by partitions 25 and 26, and then, both ends of the hollow fiber membrane bobbin are cut together with the inner tube 31 serving as a core, thereby forming the hollow fiber membrane bundle 22. Note that due to the cutting, the hollow fiber membranes 3 open at the outer surface of the partitions 25 and 26. A method for forming hollow fiber membranes is not limited to the above method, and a method similar to another known method for forming hollow fiber membranes or a modification of the known method is applicable.

Particularly, it is preferable to wind one hollow fiber membrane 3 or to wind a plurality of hollow fiber membranes 3 simultaneously around the inner tube 31 in such a manner that substantially parallel and adjacent hollow fiber membranes 3 are spaced at substantially regular intervals. This makes it possible to suppress uneven flows of blood more effectively. A distance between adjacent hollow fiber membranes 3 is preferably, but is not limited to, 1/10 to 1/1 of the outside diameter of the hollow fiber membranes 3. Furthermore, a distance between adjacent hollow fiber membranes 3 is preferably 30 to 200 μm.

Still further, it is preferable that the hollow fiber membrane bundle 22 is formed by winding one hollow fiber membrane 3 or winding a plurality of (preferably 2 to 16) hollow fiber membranes 3 simultaneously around the inner tube 31 in such a manner that all adjacent hollow fiber membranes 3 have a substantially constant interval and by operating a rotator for rotating the inner tube 31 and a winder for weaving the hollow fiber membranes 3 under conditions of the following Formula (1) when the hollow fiber membranes 3 are wound around the inner tube 31.

TRAVERSE [mm/lot]·n(INTEGER)=TRAVERSE WINDING WIDTH·2±(FIBER OUTSIDE DIAMETER+INTERVAL)·NUMBER OF WINDING FIBERS     FORMULA (1):

With the above conditions, it is possible to reduce uneven flows of blood. The symbol "n", that is, a relation between the number of rotations of the winding rotator and the number of reciprocations of the winder, is not particularly limited but is typically 1 to 5 and more preferably 2 to 4.

In the hollow fiber membrane-based oxygenator 20, a silicone compound-containing coating layer 16 as illustrated in FIG. 2 is also formed on an inner surface 3c′ of the hollow fiber membranes 3 through which an oxygen-containing gas flows. Furthermore, an antithrombotic polymer compound-containing coat 18 is formed on the outer surface 3a′ (or the outer surface 3a′ and an outer layer 3a) of the hollow fiber membranes 3 which comes into contact with blood (blood contact portion). A preferred embodiment (inside diameter, outside diameter, thickness, porosity, pore size, and the like) of hollow fiber membranes may be similar to one illustrated in FIG. 1 but is not particularly limited thereto.

<Method for Manufacturing Oxygenator>

Next, a method for manufacturing an oxygenator according to the invention will be described in detail. The method for manufacturing an oxygenator is a method for manufacturing an oxygenator having a plurality of porous hollow fiber membranes for gas exchange, the method involving: dissolving a silicone compound in an organic solvent having a surface tension of less than 70 dyn/cm to prepare a coating solution; and bringing an inner surface of the hollow fiber membranes into contact with the coating solution under a negative pressure of 50 hPa or more and 150 hPa or less to form a coating layer containing a silicone compound (a silicone compound used for preparing the coating solution and/or a crosslinked product of the silicone compound) on the inner surface.

In the manufacturing method of this embodiment, first, a coating solution is prepared by dissolving a silicone compound in an organic solvent having a surface tension of less than 70 dyn/cm (this step is hereinafter simply referred to as "(1) Coating Solution Preparation", "Coating Solution Preparation", or "Step (1)"). Next, the inner surface of the hollow fiber membranes is brought into contact with the coating solution under a negative pressure of 50 hPa or more and 150 hPa or less (this step is hereinafter simply referred to as "(2) Coating Solution Application", "Coating Solution Application", or Step (2)"). Each step will now be described.

(1) Coating Solution Preparation

This step is to prepare a coating solution to be applied to the inner surface of the hollow fiber membranes. As described above, the coating solution includes a silicone compound and an organic solvent having a specific surface tension.

(Silicone Compound)

The silicone compound herein has a function of suppressing plasma leakage from the outer surface to the inner surface of the hollow fiber membranes. A hollow fiber membrane-based oxygenator may deteriorate in gas exchange performance due to a phenomenon called wet lung in which water vaporized from blood is retained in lumina of hollow fiber membranes. However, the silicone compound also has a function of suppressing wet lung. Any silicone compound may be used without limitation as long as it is a polymer compound having the core framework consisting of siloxane bonds (Si—O—Si). Particularly, the silicone compound is preferably one represented by the following Formula (1) because of its ability to form a coating layer with excellent anti-plasma leakage properties. In other words, according to a preferred embodiment of the invention, there is provided a method for manufacturing an oxygenator using a silicone compound represented by the following Formula (1):

[Formula 1]

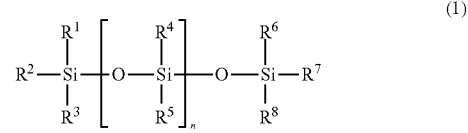

In Formula (1), $R^1$ to $R^8$ are each independently a $C_{1-6}$ alkyl group, a $C_{6-30}$ aromatic hydrocarbon group, or a reactive group selected from the group consisting of $C_{1-6}$ group with an ethylenically unsaturated bond-containing group, amino group, hydroxy group, carboxy group, maleimide group, thiol group, and halogen group. The symbol "n" is 1 or more and 100,000 or less.

In the silicone compound represented by Formula (1), $R^1$ to $R^8$ may be each independently a $C_{1-6}$ alkyl group or a $C_{6-30}$ aromatic hydrocarbon group, but it is preferable that at least one of $R^1$ to $R^8$ is a reactive group selected from the group consisting of $C_{1-6}$ group with an ethylenically unsaturated bond-containing group, amino group, hydroxy group, carboxy group, maleimide group, thiol group, and halogen group. More preferably, at least one of $R^1$ to $R^3$ and at least one of $R^6$ to $R^8$ are each independently a reactive group selected from the group consisting of $C_{1-6}$ group with an ethylenically unsaturated bond-containing group, amino group, hydroxy group, carboxy group, maleimide group, thiol group, and halogen group, and the rest of $R^1$ to $R^3$, $R^4$ and $R^5$, and the rest of $R^6$ to $R^8$ are each independently a $C_{1-6}$ alkyl group or a $C_{6-30}$ aromatic hydrocarbon group. Still more preferably, one of $R^1$ to $R^3$ and one of $R^6$ to $R^8$ are each independently a reactive group selected from the group consisting of $C_{1-6}$ group with an ethylenically unsaturated bond-containing group, amino group, hydroxy group, carboxy group, maleimide group, thiol group, and halogen group, and the other two of $R^1$ to $R^3$, $R^4$ and $R^5$, and the other two of $R^6$ to $R^8$ are each independently a $C_{1-6}$ alkyl group or a $C_{6-30}$ aromatic hydrocarbon group. Since the silicone compound represented by Formula (1) has a reactive group, crosslinking reactions proceed during forming of a coating layer (for example, drying of the organic solvent), which leads to generation of a crosslinked product of the silicone compound. Accordingly, the coating layer improves in adhesion and durability.

In a case where the silicone compound used for preparing the coating solution (preferably the silicone compound represented by Formula (1)) does not have a reactive group, the silicone compound may be contained as it is in the coating layer formed on the inner surface of the hollow fiber membranes. However, in a case where the silicone compound used for preparing the coating solution (preferably the silicone compound represented by Formula (1)) has a reactive group as described above, the coating layer formed on the inner surface of the hollow fiber membranes may contain the silicone compound used for preparing the coating solution (that is, an uncrosslinked silicone compound) and/or a crosslinked product of the silicone compound. In other words, the coating layer formed on the inner surface of the hollow fiber membranes may contain the silicone compound used for preparing the coating solution and/or a crosslinked product of the silicone compound.

Examples of the $C_{1-6}$ alkyl group or $C_{6-30}$ aromatic hydrocarbon group in Formula (1) include groups derived from methyl group, ethyl group, n-propyl group, phenyl group, fluorescein, and derivatives thereof. Examples of the derivatives of fluorescein include fluorescein isothiocyanate, N-hydroxysuccinimide fluorescein, OregonGreen, Tokyo-Green, SNAFL, carboxyfluorescein, carboxyfluorescein diacetate, and aminofluorescein. Among these examples, methyl group and ethyl group are preferable, and methyl group is more preferable from perspectives of fluidity and Young's modulus after curing. Examples of the $C_{1-6}$ group with an ethylenically unsaturated bond-containing group include vinyl group, vinyloxy group, allyl group, allyloxy group, propenyl group, and propenyloxy group. Examples of the functional group containing an amino group include amino group and aminophenyl group. Examples of the functional group containing a hydroxy group include hydroxy group, phenol group, and catechol group. Examples of the functional group containing a carboxy group include carboxy group and maleic acid group. An example of the functional group containing a maleimide group includes maleimide group. Examples of the functional group containing a thiol group include thiol group and thiophenol group. Examples of the halogen group include fluoro group, chloro group, bromo group, and iodo group. Among these examples, vinyloxy group, allyloxy group, and allyl group are preferable, and vinyloxy group is more preferable from a perspective of good crosslinking reactivity.

The symbol "n" in Formula (1) is preferably 1 or more and 100,000 or less, and more preferably 1 or more and 10,000 or less, but is not particularly limited thereto. When "n" falls within these ranges, it is possible to allow the solution to pass through fiber lumina under a negative pressure.

The silicone compound may be either a commercial product or a synthetic product. Examples of the commercial product include SYLGARD (registered trademark) 184 and 186 available from by Dow Corning.

One kind of silicone compound may be used independently or two or more kinds may be used in combination.

The silicone compound in the coating solution is not particularly limited in concentration and preferably has a concentration of 10 mg/mL or more and less than 800 mg/mL, more preferably 20 to 400 mg/mL, and still more preferably 100 to 300 mg/mL from a perspective of improving permeability of the coating solution in the lumina of the hollow fiber membranes. When forming a coating layer by one coating solution application, the silicon compound in the coating solution preferably has a concentration of 100 to 400 mg/mL and more preferably 100 to 300 mg/mL from a perspective of forming a sufficiently thick coating layer. When forming a coating layer by multiple coating solution applications, the silicon compound in the coating solution preferably has a concentration of 10 to 100 mg/mL and more preferably 20 to 70 mg/mL because a sufficiently thick coating layer is formed even with the silicon compound in low concentration.

(Organic Solvent)

The organic solvent is used for the purpose of dissolving the silicone compound. In the manufacturing method according to this embodiment, the organic solvent is required to have a surface tension of less than 70 dyn/cm in order to allow the coating solution to pass through the lumina of the hollow fiber membranes. An organic solvent having a surface tension of 70 dyn/cm or more may cause problems such as reduction in solubility of the silicone compound and difficulty in permeating the coating solution, which may hinder formation of a coating layer. From perspectives of improving the solubility of the silicone compound and improving the permeability of the coating solution in the lumina of the hollow fiber membranes, the organic solvent preferably has a surface tension of 50 dyn/cm or less, more preferably 40 dyn/cm or less, and still more preferably 30 dyn/cm or less. The lower limit of the surface tension is not particularly limited but is preferably 15 dyn/cm or more from a perspective of allowing the coating solution to flow through the hollow fibers without any problem and from a perspective of preventing the coating solution from passing through the pores of the hollow fiber membranes. The numerical range of the surface tension of the organic solvent is preferably 15 dyn/cm or more and less than 70 dyn/cm, more preferably 15 dyn/cm or more and 50 dyn/cm or less, still more preferably 15 dyn/cm or more and 40 dyn/cm or less, and particularly preferably 15 dyn/cm or more and 30 dyn/cm or less. Note that 1 dyn/cm is 0.001 N/m.

Herein, a surface tension of the organic solvent (or a surface tension of a mixed organic solvent when using two or more mixed organic solvents) can be measured at 20° C. using a Du Nuoy surface tensiometer (available from Ito Seisakusho). Specifically, a platinum ring is hung on the tip of a thin rod attached to the center of a steel wire, and the platinum ring is brought into contact with the surface of the organic solvent at a horizontal position. The steel wire is then twisted by turning a knob to pull up the platinum ring. A value at the moment when the platinum ring separates from the solvent surface is read with a scale plate and a pointer. This value is taken as the surface tension (dyn/cm) of the organic solvent.

Examples of the organic solvent include aromatic hydrocarbons such as toluene (28.5 dyn/cm) and xylene (28.4 dyn/cm), cyclohexane (25.3 dyn/cm), n-hexane (18.4 dyn/cm), n-heptane (20.1 dyn/cm), diethyl ether (16.96 dyn/cm), diisopropyl ether (17.1 dyn/cm), methyl hexyl ether (23.5 dyn/cm), ethyl acetate (24.0 dyn/cm), butyl acetate (25.2 dyn/cm), isopropyl laurate (30.1 dyn/cm), isopropyl myristate (28.3 dyn/cm), methyl ethyl ketone (24.6 dyn/cm), methyl isobutyl ketone (23.9 dyn/cm), lauryl alcohol (24.0 dyn/cm), acetone (23.3 dyn/cm), butyl alcohol (25.4 dyn/cm), 1-propanol (23.7 dyn/cm), isopropanol (23.0 dyn/cm), 2-ethylhexanol (26.9 dyn/cm), chloroform (26.7 dyn/cm), and fluorine-based solvents such as hydrofluoroether (13.6 dyn/cm), hydrofluoroolefin (17.9 dyn/cm), hydrofluorocarbon (13.6 dyn/cm), hydrochlorofluoroolefin (14.6 dyn/cm), and hydrochlorofluorocarbon (12.7 dyn/cm). Among these examples, n-hexane, cyclohexane, acetone, butyl alcohol, 1-propanol, isopropanol, chloroform, diethyl ether, aromatic hydrocarbons, and fluorine-based solvents are preferable, and n-hexane and acetone are more preferable from a perspective that the silicone compound is dissolved well and from a perspective that the organic solvent is easily removed at a low boiling point. One of these examples of the solvent may be used independently or two or more kinds may be used in combination. In other words, according to a preferred embodiment of the invention, there is provided a method for manufacturing an oxygenator, in which the organic solvent is at least one selected from the group consisting of n-hexane, cyclohexane, acetone, butyl alcohol, 1-propanol, isopropanol, chloroform, diethyl ether, aromatic hydrocarbon, and fluorine-based solvent. Note that as long as a solvent for dissolving the silicone compound has a surface tension of less than 70 dyn/cm, the solvent may contain an organic solvent having a surface tension of 70 dyn/cm or more.

In addition to the silicone compound and the organic solvent, the coating solution may optionally contain an additive. Examples of the additive include Carnauba wax, PDMS-PEG, and crosslinkers.

(2) Coating Solution Application

This step is to bring the inner surface of the hollow fiber membranes into contact with the coating solution under a negative pressure of 50 hPa or more and 150 hPa or less. This step may optionally include other operations.

Since an embodiment (material, inside diameter, outside diameter, thickness, porosity, and pore size) of the hollow fiber membranes to which the coating solution is to be applied has been described in the section labelled <Oxygenator>, the details thereof will not hereinafter be described.

When bringing the inner surface of the hollow fiber membranes into contact with the coating solution, the lumina of the hollow fiber membranes are evacuated to a negative pressure of 50 hPa or more and 150 hPa or less, preferably 50 hPa or more and 100 hPa or less. As an example of a method for evacuating the hollow fiber membranes to a negative pressure, a vacuum pump (such as a diaphragm pump) is airtightly connected to one end of the hollow fiber membranes and then operated, but the method is not particularly limited thereto. As in the Examples to be described, the standard pressure of a vacuum pump is employed as the atmospheric pressure.

In this manner, the inner surface of the hollow fiber membranes is brought into contact with the coating solution with the lumina of the hollow fiber membranes being under a predetermined negative pressure. As an example of a method for bringing the hollow fiber membranes into contact with the coating solution, the coating solution is injected from the other end (end not connected to the vacuum pump) of the hollow fiber membranes while being connected to the vacuum pump, but the method is not particularly limited thereto. According to this method, the coating solution moves to the end to which the vacuum pump is connected, and then, touches the inner surface of the hollow fiber membranes. A time of contact between the inner surface of the hollow fiber membranes and the coating solution is not particularly limited but is preferably 5 to 180 seconds, more preferably 15 to 120 seconds, and still more preferably 30 to 60 seconds.

An amount of the coating solution per membrane area to be brought into contact with the lumina of the hollow fiber membranes is preferably 10 to 10,000 mL/m$^2$, more preferably 30 to 1,000 mL/m$^2$, and still more preferably 40 to 200 mL/m$^2$ from a perspective of forming a coating layer with a desired thickness.

After that, the organic solvent contained in the coating film is optionally dried. Examples of the drying include, but are not particularly limited to, vacuum drying and high-temperature drying at normal pressure. In high-temperature drying, the organic solvent is preferably dried at a temperature of 45 to 80° C. and for 1 to 48 hours. That is, according to a preferred embodiment of the invention, there is provided a method for manufacturing an oxygenator having a plurality of porous hollow fiber membranes for gas exchange, the method involving: dissolving a silicone compound in an organic solvent having a surface tension of less than 70 dyn/cm to prepare a coating solution ((1) Coating Solution Preparation); and drying the organic solvent after bringing an inner surface of the hollow fiber membranes into contact with the coating solution under a negative pressure of 50 hPa or more and 150 hPa or less ((2') Coating Solution Application and Drying) to form a silicone compound-containing coating layer on the inner surface.

The coating layer after drying is not particularly limited in thickness and preferably has a thickness of 0.1 to 10 µm, more preferably 0.5 to 7 µm, and still more preferably 1 to 5 µm. With a thickness of 0.1 µm or more, the coating layer obtains sufficient anti-plasma leakage properties. With a thickness of 10 µm or less, the coating layer is prevented from deteriorating in gas exchange performance.

The operation of bringing the inner surface of the hollow fiber membranes into contact with the coating solution under a negative pressure of 50 hPa or more and 150 hPa or less may be performed once or more. As described above, in a case where the silicone compound in the coating solution is in low concentration, it is possible to form a sufficiently thick coating layer by performing the operation more than once. When performing the operation more than once, drying the organic solvent after the operation is regarded as one cycle, and the cycle is preferably repeated multiple times. That is, the invention relates to a method for manufacturing an oxygenator having a plurality of porous hollow fiber membranes for gas exchange, the method involving: (1) dissolving a silicone compound in an organic solvent having a surface tension of less than 70 dyn/cm to prepare a coating solution ((1) Coating Solution Preparation); and (2') drying the organic solvent after bringing an inner surface of the hollow fiber membranes into contact with the coating solution under a negative pressure of 50 hPa or more and 150 hPa or less ((2') Coating Solution Application and Drying) to form a silicone compound-containing coating layer on the inner surface by repeating (2') Coating Solution Application and Drying more than once.

The number of times to repeat the operation of Step (2') is not particularly limited but is preferably 2 to 5 times, more preferably 2 to 4 times, still more preferably 2 or 3 times.

A silicone compound-containing coating layer is formed on the inner surface of the hollow fiber membranes by Steps (1) and (2). The method for manufacturing an oxygenator according to this embodiment may optionally include other steps in addition to Steps (1) and (2). Other steps include the following (3) Antithrombotic Coat Formation. The step is preferably performed after Steps (1) and (2).

(3) Antithrombotic Coat Formation

This step is to form an antithrombotic polymer compound-containing coat on the outer surface of the hollow fiber membranes. In other words, according to a preferred embodiment of the invention, there is provided a method for manufacturing an oxygenator, the method further involving forming an antithrombotic polymer compound-containing coat on the outer surface of the hollow fiber membranes. A method for forming an antithrombotic polymer compound and a coat is not particularly limited and may appropriately employ a known method.

(Antithrombotic Polymer Compound)

The antithrombotic polymer compound applied to the outer surface of the hollow fiber membranes, or the blood contact portion, imparts antithrombogenicity to the oxygenator.

Any antithrombotic polymer compound is employed without limitation as long as the compound has antithrombogenicity and biocompatibility. Particularly, from a perspective of excellent properties, the antithrombotic polymer compound preferably has an alkoxyalkyl (meth)acrylate-derived unit represented by the following Formula (I):

[Formula 2]

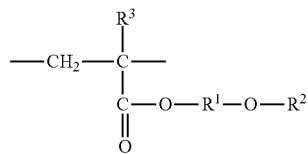

(I)

In Formula (I), $R^3$ is a hydrogen atom or a methyl group, $R^1$ is a $C_{1-4}$ alkylene group, and $R^2$ is a $C_{1-4}$ alkyl group.

The compound having the unit represented by Formula (I) is excellent in antithrombotic biocompatibility (has excellent effects of suppressing and preventing adhesion/attachment of platelets and suppressing and preventing activation of platelets), particularly, excellent effects of suppressing and preventing adhesion/attachment of platelets. Accordingly, using the compound having the unit makes it possible to manufacture an oxygenator having excellent antithrombotic biocompatibility (excellent effects of suppressing and preventing adhesion/attachment of platelets and suppressing and preventing activation of platelets), particularly, excellent effects of suppressing and preventing adhesion/attachment of platelets.

Herein, "(meth)acrylate" represents "acrylate and/or methacrylate". In other words, the term "alkoxyalkyl (meth)acrylate" includes not only "alkoxyalkyl acrylate or alkoxyalkyl methacrylate" but also "alkoxyalkyl acrylate and alkoxyalkyl methacrylate".

In Formula (I), $R^1$ is a $C_{1-4}$ alkylene group. Examples of the $C_{1-4}$ alkylene group include, but are not particularly limited to, linear or branched alkylene groups such as methylene group, ethylene group, trimethylene group, tetramethylene group, and propylene group. Among these examples, ethylene group and propylene group are preferable, and ethylene group is particularly preferable in consideration of further improving antithrombogenicity and biocompatibility. $R^2$ is a $C_{1-4}$ alkyl group. Examples of the $C_{1-4}$ alkyl group include, but are not particularly limited to, linear or branched alkyl groups such as methyl group, ethyl group, propyl group, isopropyl group, butyl group, isobutyl group, sec-butyl group, and tert-butyl group. Among these examples, methyl group and ethylene group are preferable, and methyl group is particularly preferable in consideration of further improving antithrombogenicity and biocompatibility. $R^3$ is a hydrogen atom or a methyl group. In a case where the antithrombotic polymer compound has two or more kinds of alkoxyalkyl (meth)acrylate-derived units, the units may be the same or different.

Specific examples of the alkoxyalkyl (meth)acrylate include methoxymethyl acrylate, methoxyethyl acrylate, methoxypropyl acrylate, ethoxymethyl acrylate, ethoxyethyl acrylate, ethoxypropyl acrylate, ethoxybutyl acrylate, propoxymethyl acrylate, butoxyethyl acrylate, methoxybutyl acrylate, methoxymethyl methacrylate, methoxyethyl methacrylate, ethoxymethyl methacrylate, ethoxyethyl methacrylate, propoxymethyl methacrylate, and butoxyethyl methacrylate. Among these examples, methoxyethyl (meth)acrylate and methoxybutyl acrylate are preferable, and methoxyethyl acrylate (MEA) is particularly preferable from a perspective of further improving antithrombogenicity and biocompatibility. In other words, the antithrombotic polymer compound is preferably polymethoxyethyl acrylate (PMEA). One of these examples of the alkoxyalkyl (meth)acrylate may be used independently or two or more kinds may be used in combination.

The antithrombotic polymer compound according to the invention preferably has an alkoxyalkyl (meth)acrylate-derived unit and may be a polymer (homopolymer) having one kind or two or more kinds of alkoxyalkyl (meth)acrylate-derived units. Alternatively, the antithrombotic polymer compound may be a polymer (copolymer) having one kind or two or more kinds of alkoxyalkyl (meth)acrylate-derived units and one kind or two or more kinds of monomer-derived units (other units) copolymerizable with the alkoxyalkyl (meth)acrylate. In a case where the antithrombotic polymer compound according to the invention has two or more units, the polymer (copolymer) is not particularly limited in structure and may be any of a random copolymer, alternating copolymer, periodic copolymer, and block copolymer. A terminal of the polymer is not particularly limited and is appropriately determined depending on the type of a raw material to be used and is typically a hydrogen atom.

Herein, in a case where the antithrombotic polymer compound according to the invention has another unit in addition to the alkoxyalkyl (meth)acrylate-derived unit, monomers copolymerizable with the alkoxyalkyl (meth)acrylate (copolymerizable monomers) is not particularly limited. Examples of the copolymerizable monomers include methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hexyl acrylate, hexyl methacrylate, ethylene, propylene, acrylamide, N, N-dimethylacrylamide, N, N-diethylacrylamide, aminomethyl acrylate, aminoethyl acrylate, aminoisopropyl acrylate, diaminomethyl acrylate, diaminoethyl acrylate, diaminobutyl acrylate, methacrylamide, N, N-dimethylmethacrylamide, N, N-diethylmethacrylamide, aminomethyl methacrylate, aminoethyl methacrylate, diaminomethyl methacrylate, and diaminoethyl methacrylate. Among these examples, the copolymerizable monomers are preferably one having no hydroxyl group or cationic group in a molecule. The copolymer may be any of a random copolymer, block copolymer, and graft copolymer and is synthesized by a known method such as radical polymerization, ion polymerization, and polymerization using a macromer. Herein, a proportion of units derived from the copolymerizable monomers in all the units of the copolymer is not particularly limited. However, in consideration of antithrombogenicity, biocompatibility, and the like, the units derived from the copolymerizable monomers (other units) preferably account for more than 0 mol % and 50 mol % or less of all the units of the copolymer. A proportion more than 50 mol % may deteriorate the effects of the alkoxyalkyl (meth)acrylate.

A weight average molecular weight of the antithrombotic polymer compound herein is not particularly limited but is preferably 80,000 or more. In the method for manufacturing an oxygenator according to this embodiment, the antithrombotic polymer compound is applied to the outer surface of the hollow fiber membranes in the form of an aqueous coating solution. Therefore, from a perspective of easily preparing a desired aqueous coating solution, the antithrombotic polymer compound preferably has a weight average molecular weight less than 800,000. Such a range suppresses aggregation or precipitation of antithrombotic polymer compounds contained in an antithrombotic polymer compound-containing solution and enables preparation of a stable aqueous coating solution. Furthermore, a weight average molecular weight of the antithrombotic polymer compound is preferably more than 200,000 and less than 800,000, more preferably 210,000 or more and 600,000 or less, still more preferably 220,000 or more and 500,000 or less, and particularly preferably 230,000 or more and 450,000 or less.

Herein, the "weight average molecular weight" is measured by gel permeation chromatography (GPC) using polystyrene as a standard substance and tetrahydrofuran (THF) as a mobile phase. Specifically, a polymer of interest is dissolved in THF to prepare a 10 mg/ml solution. GPC column LF-804 available from Shodex is attached to GPC system LC-20 available from Shimadzu Corporation, and THF is allowed to flow as a mobile phase through the column. Using polystyrene as a standard substance, the polymer of interest in the prepared polymer solution is measured by GPC. A calibration curve is prepared using the standard polystyrene. Based on this curve, a weight average molecular weight of the polymer of interest is calculated.

It is inferred that an increase of molecular weight of the antithrombotic polymer compound reduces an amount of polymers having a relatively low molecular weight contained in a coat, which leads to suppression and prevention of the polymers having a relatively low molecular weight from being transferred to blood. Accordingly, with a weight average molecular weight falling within the above ranges, the antithrombotic polymer compound suppresses and prevents a transfer of a coat (particularly, polymers having a low molecular weight) to blood more effectively. It is also preferable from a perspective of antithrombogenicity and biocompatibility. In addition, the "polymers having a low molecular weight" herein refers to polymers having a weight average molecular weight less than 60,000. A method for measuring a weight average molecular weight is as described above.

The antithrombotic polymer compound containing the alkoxyalkyl (meth)acrylate-derived unit represented by Formula (I) is produced by a known method. As a preferred example, specifically, alkoxyalkyl (meth)acrylate represented by the following Formula (II) and one or more optionally-added monomers copolymerizable with the alkoxyalkyl (meth)acrylate (copolymerizable monomers) are stirred together with a polymerization initiator in a polymerization solvent to prepare a monomer solution, followed by heating the monomer solution to (co)polymerize the alkoxyalkyl (meth)acrylate or (co)polymerize the alkoxyalkyl (meth)acrylate and the optionally-added copolymerizable monomers.

[Formula 3]

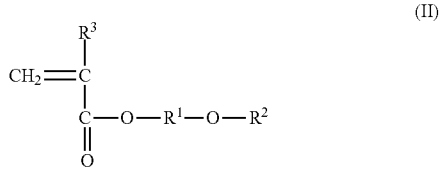

(II)

The substituents $R^1$, $R^2$, and $R^3$ in Formula (II) are similar to those defined in Formula (I) and will not hereinafter be described.

The polymerization solvent used in preparing the monomer solution is not particularly limited as long as the solvent dissolves the alkoxyalkyl (meth)acrylate represented by Formula (II) and the optionally-added copolymerizable monomers. Examples of the polymerization solvent include aqueous solvents such as water, alcohols (for example, methanol, ethanol, propanol, and isopropanol), and polyethylene glycols; aromatic solvents such as toluene, xylene, and tetralin; and halogen-based solvents such as chloroform, dichloroethane, chlorobenzene, dichlorobenzene, and trichlorobenzene. Among these examples, methanol is preferable in consideration of dissolubility of alkoxyalkyl (meth)acrylate and obtainability of polymers having a weight average molecular weight as described above.

The monomer solution is not particularly limited in concentration of monomers. However, a relatively high concentration of monomers causes an increase in weight average molecular weight of the obtained antithrombotic polymer compound. Therefore, in consideration of obtainability of polymers having a weight average molecular weight as described above, the monomer solution preferably has a concentration of monomers less than 50 mass %, and more preferably 15 mass % or more and less than 50 mass %. Furthermore, the monomer solution more preferably has a concentration of monomers of 20 mass % or more and 48 mass % or less, and particularly preferably 25 mass % or more and 45 mass % or less. In a case where two or more monomers are used, the concentration of monomers represents the total concentration of the monomers employed.

The polymerization initiator is not particularly limited, and a known polymerization initiator may be used. The polymerization initiator is preferably a radical polymerization initiator from a perspective of excellent polymerization stability. Specific examples of the radical polymerization initiator include persulfates such as potassium persulfate (KPS), sodium persulfate, and ammonium persulfate; peroxides such as hydrogen peroxide, t-butyl peroxide, and methyl ethyl ketone peroxide; and azo compounds such as azobisisobutyronitrile (AIBN), 2,2'-azobis (4-methoxy-2,4-dimethylvaleronitrile), 2,2'-azobis (2,4-dimethylvaleronitrile), 2,2'-azobis [2-(2-imidazoline-2-yl) propane] dihydrochloride, 2,2'-azobis [2-(2-imidazoline-2-yl) propane] disulfate dihydrate, 2,2'-azobis (2-methylpropionamidine) dihydrochloride, 2,2'-azobis [N-(2-carboxyethyl)-2 methylpropionamidine)] hydrate, 3-hydroxy-1,1-dimethylbutyl peroxyneodecanoate, α-cumyl peroxyneodecanoate, 1,1,3, 3-tetrabutyl peroxyneodecanoate, t-butyl peroxyneodecanoate, t-butyl peroxyneoheptanoate, t-butyl peroxypivalate, t-amyl peroxyneodecanoate, t-amyl peroxypivalate, di(2-ethylhexyl) peroxydicarbonate, di(sec-butyl) peroxydicarbonate, and azobiscyanovaleric acid. Alternatively, for example, a reducing agent such as sodium sulfite, sodium bisulfite, and ascorbic acid may be used in combination with the radical polymerization initiator as a redox initiator. An amount of the polymerization initiator to be mixed is preferably 0.0001 to 1 mol %, more preferably 0.001 to 0.8 mol %, and particularly preferably 0.01 to 0.5 mol % with respect to the total amount of the monomers (alkoxyalkyl (meth)acrylate and the optionally-added copolymerizable monomers; hereinafter, the same shall apply). Alternatively, an amount of the polymerization initiator to be mixed is preferably 0.005 to 2 parts by mass and more preferably 0.05 to 0.5 parts by mass with respect to 100 parts by mass of the monomers (or with respect to all kinds of monomers when using multiple kinds of monomers). Mixing such an amount of the polymerization initiator enables more efficient production of polymers having a desired weight average molecular weight.

The polymerization initiator may be mixed as it is with the monomers and the polymerization solvent. Alternatively, the polymerization initiator may be mixed with the monomers and the polymerization solvent by being dissolved in another solvent in advance. In the latter case, an example of the other solvent includes, but is not particularly limited to, a solvent similar to the polymerization solvent as long as it dissolves the polymerization initiator. The other solvent may be the same as or different from the polymerization solvent but is preferably the same as the polymerization solvent in consideration of polymerization controllability. The polymerization initiator in the other solvent in this case is not particularly limited in concentration. In consideration of mixability and the like, an amount of the polymerization initiator to be added is preferably 0.1 to 10 parts by mass, more preferably 0.15 to 5 parts by mass, and still more preferably 0.2 to 1.8 parts by mass with respect to 100 parts by mass of the other solvent.

Next, the monomer solution is heated to (co)polymerize alkoxyalkyl (meth)acrylate or alkoxyalkyl (meth)acrylate and the other monomers. The polymerization method herein may employ any known method such as radical polymerization, anionic polymerization, and cationic polymerization, but it is preferable to employ radical polymerization using radicals that are easy to produce.

Polymerization conditions are not particularly limited as long as the monomers (alkoxyalkyl (meth)acrylate or alkoxyalkyl (meth)acrylate and the copolymerizable monomers) are polymerized. Specifically, a polymerization temperature is preferably 30 to 60° C., and more preferably 40 to 55° C. A time of polymerization is preferably 1 to 24 hours, and preferably 3 to 12 hours. Such conditions enable efficient production of polymers having a high molecular weight as described. In addition, such conditions effectively suppress and prevent gelation in the polymerization, which enables high production efficiency.

Furthermore, a chain transfer agent, a polymerization rate adjusting agent, a surfactant, and other additives may be optionally used in the polymerization.

An atmosphere during polymerization reactions is not particularly limited. The polymerization may be performed, for example, in the air or an atmosphere of inert gas such as nitrogen gas and argon gas. During the polymerization reactions, the reaction solution may be stirred.

Polymers after the polymerization are purified by a typical purification method such as reprecipitation, dialysis, ultrafiltration, and extraction. Among these examples, the purification is preferably performed by reprecipitation because it is possible to obtain (co)polymers suitable for preparation of an aqueous coating solution. Note that ethanol is preferably used as a poor solvent for the reprecipitation.

The polymers after the purification are dried by any method such as freeze drying, vacuum drying, spray drying, and heat drying but are preferably dried by freeze drying or vacuum drying from a perspective that physical properties of the polymers are less affected.

(Aqueous Coating Solution Preparation)

Next, a method for preparing the aqueous coating solution according to the invention will be described.

A solvent used for preparing the antithrombotic polymer compound-containing solution (aqueous coating solution) is not particularly limited as long as the solvent enables preparation of the aqueous coating solution by appropriately dispersing the antithrombotic polymer compound. From a perspective of preventing permeation of the aqueous coating solution more effectively from the outer surface to the inner surface (the surface on the side where the oxygen-containing gas flows) of the pores of the hollow fiber membranes, the solvent preferably contains water. Herein, water is preferably pure water, ion-exchanged water, or distilled water. Among these examples, distilled water is particularly preferable.

Non-water solvent to be used for preparing the aqueous coating solution is not particularly limited. In consideration of controllability of dispersibility or the like of the antithrombotic polymer compound, methanol and acetone are preferable. One of these examples of the non-water solvent may be used independently or two or more kinds may be mixed and used as a mixture. Among these examples, methanol is preferable in consideration of further controllability of dispersibility or the like of the antithrombotic polymer compound. In other words, the solvent preferably includes water and methanol. Herein, a mixing ratio of water to methanol is not particularly limited. In consideration of dispersibility of the antithrombotic polymer compound and controllability of mean particle size of colloids, the mixing ratio (mass ratio) of water:methanol is preferably 6 to 32:1, and more preferably 10 to 25:1. That is, the solvent preferably includes water and methanol at a mixing ratio (mass ratio) of 6 to 32:1, and more preferably at a mixing ratio (mass ratio) of 10 to 25:1.

As described above, when the aqueous coating solution is prepared using a mixed solvent of water and a non-water solvent, the order of adding the solvent (for example, water and methanol) and the antithrombotic polymer compound is not particularly limited, but it is preferable to prepare the aqueous coating solution by the following procedure. That is, the aqueous coating solution is preferably prepared by adding the antithrombotic polymer compound to a non-water solvent (preferably methanol) to prepare an antithrombotic polymer compound-containing solution, and then, adding the antithrombotic polymer compound-containing solution to water. This procedure easily disperses the antithrombotic polymer compound. In addition, this procedure creates such advantages that colloids with a uniform particle size are formed and that it becomes easy to form a uniform coat.

In the procedure, a rate of adding the antithrombotic polymer compound-containing solution to water is not particularly limited, but it is preferable to add the antithrombotic polymer compound-containing solution to water at a rate of 5 to 100 g/min.

A stirring time and stirring temperature in the preparation of the aqueous coating solution are not particularly limited. From perspectives of easily forming colloids with a uniform particle size and uniformly dispersing the colloids, the antithrombotic polymer compound-containing solution is preferably stirred for 1 to 30 minutes, and more preferably 5 to 15 minutes, after being added to water. Furthermore, the stirring temperature is preferably 10 to 40° C., and more preferably 20 to 30° C.

The antithrombotic polymer compound in the aqueous coating solution is not particularly limited in concentration and preferably has a concentration of 0.01 mass % or more from a perspective of easily increasing an amount of coating. Furthermore, from the above perspective, the antithrombotic polymer compound in the aqueous coating solution preferably has a concentration of 0.05 mass % or more, and particularly preferably 0.1 mass % or more. The concentration of the antithrombotic polymer compound in the aqueous coating solution is not particularly limited by a ceiling but is preferably 0.3 mass % or less, and more preferably 0.2 mass % or less in consideration of, for example, formability of a coat and reduction in uneven coating. In addition, a concentration within such ranges also suppresses a decrease in gas exchange performance due to an excessively thick coat of the antithrombotic polymer compound.

(Aqueous Coating Solution Application)

Next, the aqueous coating solution prepared in the above manner is applied to (covered on) the outer surface of the hollow fiber membranes. Specifically, after assembling an oxygenator (for example, one having the structure illustrated in FIG. 1 or FIG. 3), the aqueous coating solution is brought into contact with (or circulated through) the outer surface of the hollow fiber membranes, whereby the outer surface (that is, the blood contact portion) of the hollow fiber membranes is covered with the antithrombotic polymer compound. Accordingly, a coating film containing the antithrombotic polymer compound is formed on the outer surface of the hollow fiber membranes. The aqueous coating solution may be applied to the hollow fiber membranes before the assembly of the oxygenator as long as the aqueous coating solution is brought into contact with (or circulated through) the outer surface of the hollow fiber membranes.

A method for bringing the outer surface of the hollow fiber membranes into contact with the aqueous coating solution containing the antithrombotic polymer compound is not particularly limited and may employ a method known in the art such as filling and dip coating (immersion). Among these examples, filling is preferable in order to increase an amount of the antithrombotic polymer compound to be coated.

When employing filling as a method for bringing the outer surface of the hollow fiber membranes into contact with the aqueous coating solution containing the antithrombotic polymer compound, a filling volume of the aqueous coating solution is preferably 50 g/m$^2$ or more and more preferably 80 g/m$^2$ or more with respect to the membrane area (m$^2$) of the hollow fiber membranes. With a filling volume of 50 g/m$^2$ or more, it is possible to form a coat containing a sufficient amount of the antithrombotic polymer compound on the surface of the hollow fiber membranes. The filling volume is not particularly limited by a ceiling but is preferably 200 g/m$^2$ or less, and more preferably 150 g/m$^2$ or less.

Herein, the "membrane area" refers to an area of the outer surface of the hollow fiber membranes and is calculated by multiplying the outside diameter, pi, the number, and the effective length of the hollow fiber membranes.

A time for bringing the outer surface of the hollow fiber membranes into contact with the aqueous coating solution containing the antithrombotic polymer compound is also not particularly limited but is preferably 0.5 minutes or more and 5 minutes or less, and more preferably 1 minute or more and 70 minutes or less in consideration of, for example, an amount of coating, formability of a coating film, and the effect of reducing uneven coating. In addition, a temperature for contacting the aqueous coating solution and the hollow fiber membranes (a temperature for circulating the aqueous coating solution to the side of the oxygenator where blood is circulated) is preferably 5 to 40° C. and more preferably 15 to 30° C. in consideration of, for example, an amount of coating, formability of a coating film, and the effect of reducing uneven coating.

An amount of the antithrombotic polymer compound to be applied to the outer surface of the hollow fiber membranes is not particularly limited but is preferably an amount that makes a dried coat have a thickness of about 5 nm to 20 µm. In a case where a thickness within the above range cannot be obtained by one application (contact), the application may be repeated until a desired thickness is obtained.

After the contact with the aqueous coating solution, the coating film is dried, whereby a covering (coat) containing the antithrombotic polymer compound according to the invention is formed on the outer surface of the hollow fiber membranes. Herein, drying conditions are not particularly limited as long the antithrombotic polymer compound-containing covering (coat) is formed on the outer surface (and on the outer layer) of the hollow fiber membranes. Specifically, a drying temperature is preferably 5 to 50° C., and more preferably 15 to 40° C. A drying time is preferably 60 to 300 minutes, and more preferably 120 to 240 minutes. Alternatively, the coating film may be dried by circulating a gas through the hollow fiber membranes continuously or stepwise at a temperature of preferably 5 to 40° C., and more preferably 15 to 30° C. Herein, the gas is not particularly limited in type as long as the gas has no influence on the coating film and is capable of drying the coating film. Specific examples of the gas include air and an inert gas such as nitrogen gas or argon gas. Furthermore, an amount of the gas to be circulated is not particularly limited as long as the gas sufficiently dries the coating film and is preferably 5 to 150 L and more preferably 30 to 100 L.

Through these steps, it is possible to obtain an oxygenator in which a silicone compound-containing coating layer is formed on an inner surface of hollow fiber membranes and an antithrombotic polymer compound-containing coat is formed on an outer surface of the hollow fiber membranes. Therefore, the manufacturing method according to this embodiment provides an oxygenator having both desired antithrombogenicity and anti-plasma leakage properties.

EXAMPLES

The effects of the invention will be described with reference to the following Examples. Note that the technical scope of the invention is not limited to the following Examples. In the following Examples, unless otherwise specified, each operation was performed at room temperature (25° C.). Unless otherwise specified, "%" and "parts" represent "% by mass" and "parts by mass", respectively.

Reference Example 1

Figure 8:
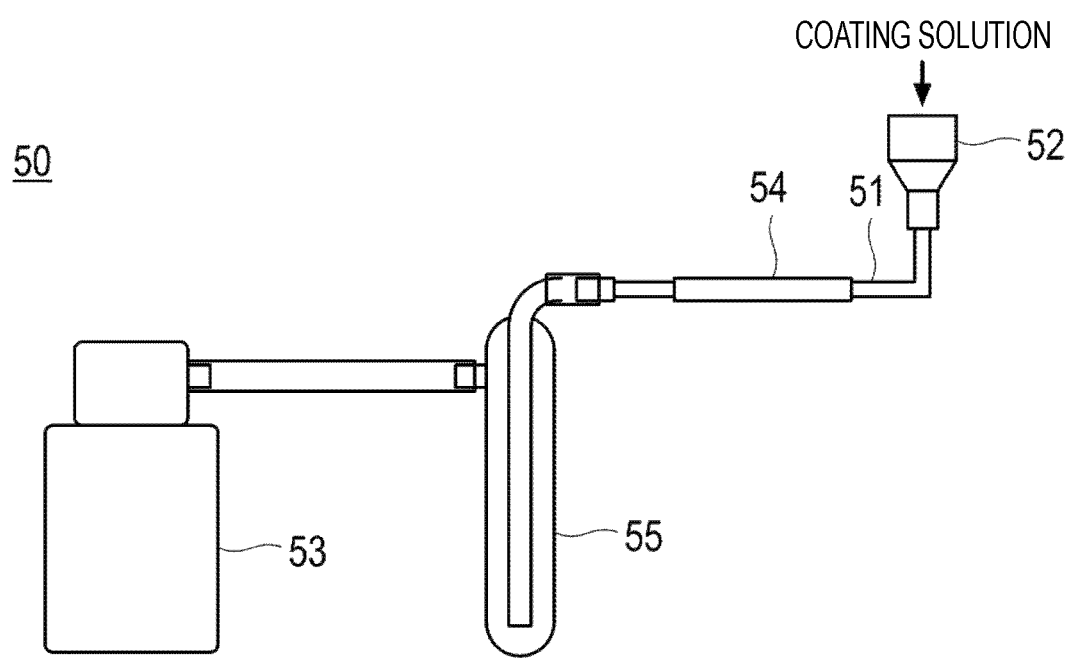
FIG. 8 is a circuit diagram used when allowing an organic solvent to pass through lumina of hollow fiber membranes in Reference Example 1.

As illustrated in FIG. 8, a feed port 52 was connected to one end of polypropylene porous hollow fiber membranes 51 (outside diameter: 170 μm, inside diameter: 112 μm, thickness: 29 μm, pore size: 0.05 μm, porosity: 30 vol. %), and a diaphragm pump 53 was connected to the other end, thereby assembling a circuit 50. A sheet 54 was wound around the outer surface of the hollow fiber membranes 51, which made it possible to check leakage of a coating solution from pores.

Acetone (surface tension: 23.3 dyn/cm) dyed with rhodamine B was poured into the feed port 52 in advance, and the standard pressure of the diaphragm pump 53 was reduced to 50 hPa. Accordingly, lumina of the hollow fiber membranes 51 were evacuated to a negative pressure of 50 hPa, which allowed acetone to pass through the lumina over 30 seconds. Acetone after the passage was collected by a trap 55.

Figure 9:
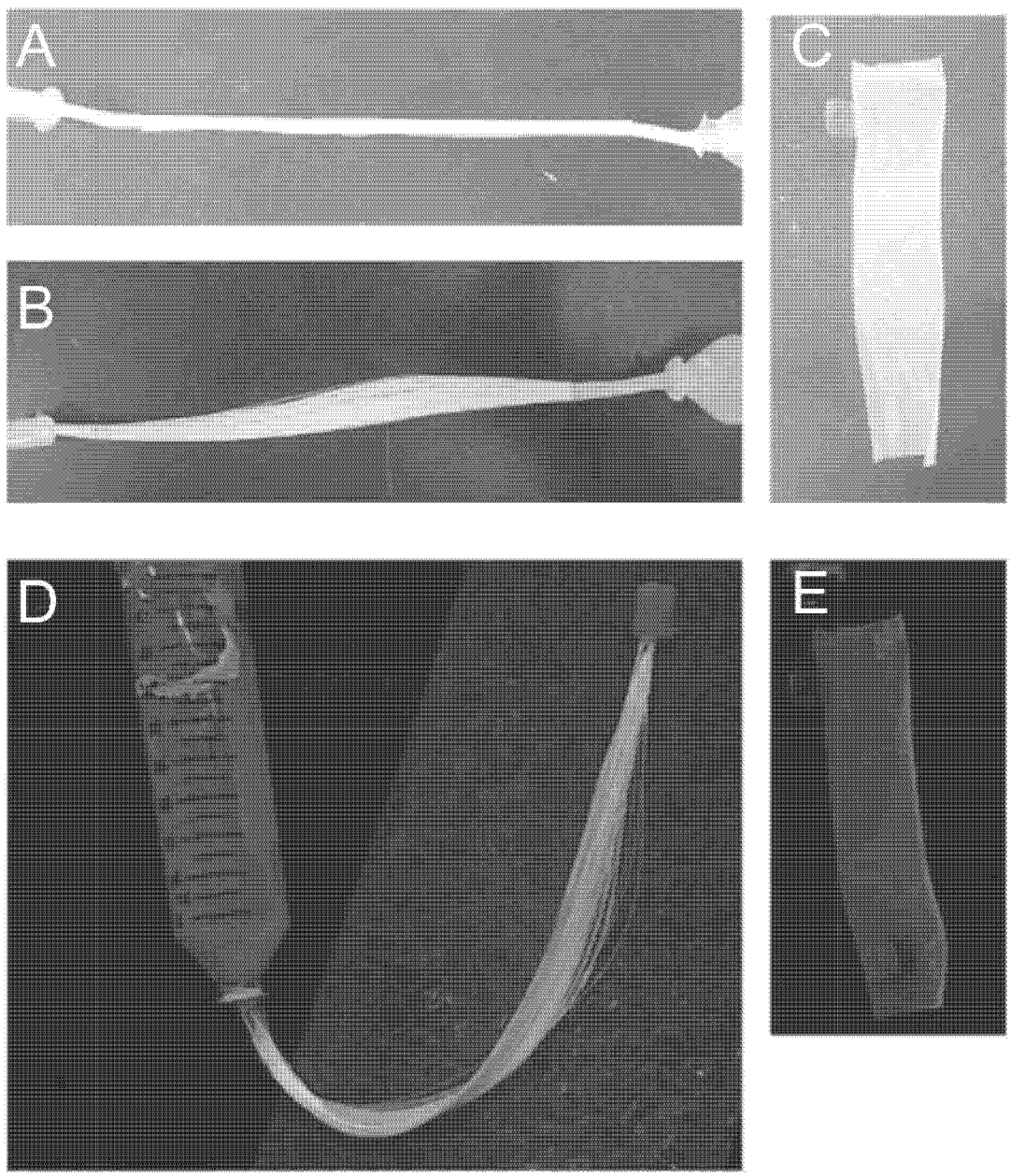
FIG. 9 shows photographic depictions before and after allowing the organic solvent (acetone dyed with rhodamine B) to pass through the lumina of the hollow fiber membranes in Reference Example 1, including a View A under visible light showing the exterior of the hollow fiber membranes before allowing passage of the solvent; a View B under visible light showing the exterior of the hollow fiber membranes after allowing passage of the solvent; a View C under visible light showing a sheet wound around an outer surface of the hollow fiber membranes after allowing passage of the solvent; a View D under UV irradiation, showing the exterior of the hollow fiber membranes after allowing passage of the solvent; and a View E under UV irradiation, showing the sheet wound around the outer surface of the hollow fiber membranes after allowing passage of the solvent.

After the passage of acetone, the hollow fiber membranes 51 and the sheet 54 were removed from the circuit 50 and were irradiated with UV in a dark room to observe the presence or absence of fluorescence. As illustrated in view D of FIG. 9, fluorescence due to rhodamine B was observed in the hollow fiber membranes 51 after the passage of acetone. In contrast, as illustrated in view E of FIG. 9, no fluorescence was observed in the sheet 54. These results showed that rhodamine B was attached to the inner surface of the hollow fiber membranes 51 without leakage of acetone from the pores and was not attached to the outer surface.

Reference Example 2

An operation similar to Reference Example 1 was performed except that n-hexane (surface tension: 18.4 dyn/cm) was used as a solvent.

Similarly to Reference Example 1, rhodamine B was found to be attached to the inner surface of the hollow fiber membranes 51 without leakage of n-hexane and was not attached to the outer surface.

Reference Example 3

An operation similar to Reference Example 1 was performed except that 1-propanol (surface tension: 23.7 dyn/cm) was used as a solvent.

Similarly to Reference Example 1, rhodamine B was found to be attached to the inner surface of the hollow fiber membranes 51 without leakage of 1-propanol and was not attached to the outer surface.

Example 1

Polydimethylsiloxane (PDMS, SYLGARD (registered trademark) 184) was dissolved in n-hexane (surface tension: 18.4 dyn/cm) to prepare a coating solution having a PDMS concentration of 200 mg/mL. An operation similar to Reference Example 1 was performed except that 40 mL/m$^2$ per membrane area of the coating solution was allowed to pass through lumina of hollow fiber membranes 51.

Note that polydimethylsiloxane (PDMS, SYLGARD (registered trademark) 184) has a structure represented by Formula (1) where $R^1$, $R^3$, $R^4$, $R^5$, $R^6$, and $R^8$ are methyl groups and $R^2$ and $R^7$ are vinyloxy groups (—O—CH=CH$_2$).

After passing the solution, the hollow fiber membranes 51 and the sheet 54 were removed from the circuit 50 and were visually observed. No leakage of the coating solution was found.

The hollow fiber membranes 51 were left to stand in an oven at 60° C. for 12 hours to dry the solvent remaining in the lumina of the hollow fiber membranes 51, thereby obtaining coated hollow fiber membranes having a coating layer with a thickness of 4 μm.

<Evaluation>

With regard to the coated hollow fiber membranes obtained in Example 1, gas permeability and anti-plasma leakage properties were evaluated.

[Gas Permeability]

Figure 10:
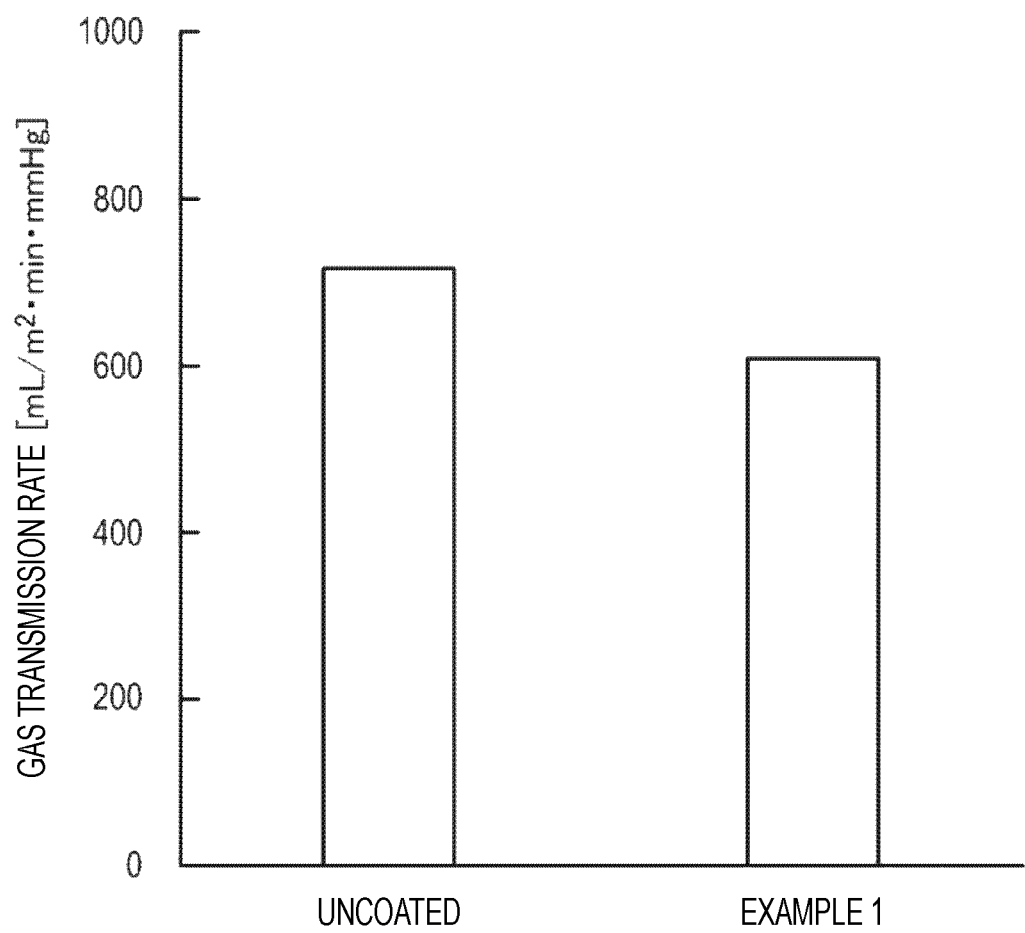
FIG. 10 is a graph illustrating gas permeability for coated and uncoated Examples.

The coated hollow fiber membranes were potted in an epoxy resin, and the outside of the hollow fiber membranes was filled with a mixed gas of oxygen and nitrogen. A pressure of 50 mmHg was applied to the gas, and the rate of the gas flowing from the outside to the lumina of the hollow fiber membranes was measured to evaluate gas permeability. Gas permeability of uncoated hollow fiber membranes was also evaluated in a similar manner. FIG. 10 shows the results. FIG. 10 is a bar graph where the gas transmission rate per unit (area·time) is taken along the ordinate. The larger the value of the ordinate, the better the gas permeability.

As illustrated in FIG. 10, the coated hollow fiber membranes were found to be lower in gas permeability than the uncoated hollow fiber membranes but have sufficient gas permeability required for an oxygenator (1.0 mL/m$^2$·min·mmHg or more).

[Anti-Plasma Leakage Properties]

Figure 11:
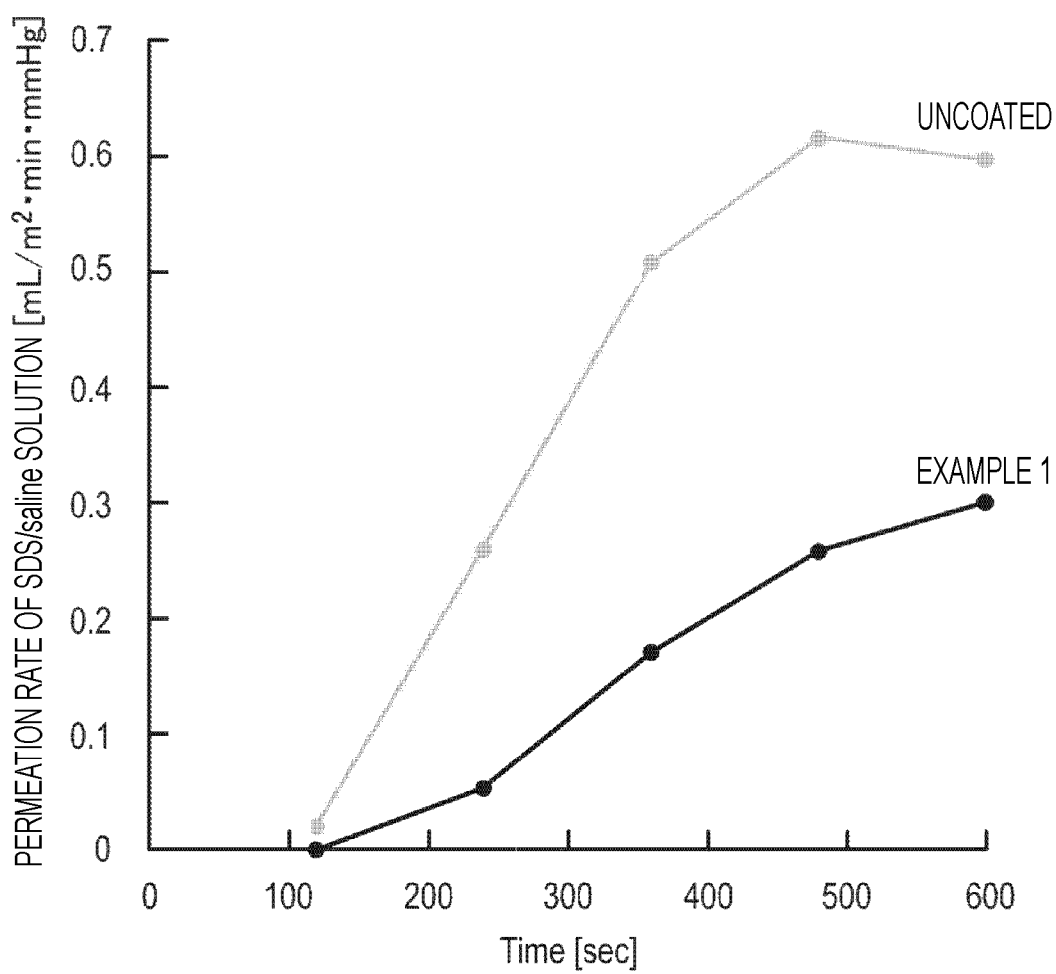
FIG. 11 is a graph illustrating anti-plasma leakage properties for coated and uncoated Examples.

The coated hollow fiber membranes were potted in an epoxy resin, and the outside of the hollow fiber membranes was filled with a solution (SDS/saline solution) having an SDS concentration of 1 mg/mL prepared by dissolving sodium dodecyl sulfate (SDS) in a 0.9 w/v % sodium chloride aqueous solution. A pressure of 760 mmHg was applied to the SDS/saline solution, and the rate of the SDS/saline solution permeating the lumina from the outside of the hollow fiber membranes was measured to evaluate anti-plasma leakage properties. Anti-plasma leakage properties of the uncoated hollow fiber membranes were also evaluated in a similar manner. FIG. 11 shows the results. FIG. 11 is a graph where the permeation rate of the SDS/saline solution per unit (area·time) is taken along the ordinate and the time is taken along the abscissa. The larger the value of the ordinate, the better the anti-plasma leakage properties.

As illustrated in FIG. 11, the coated hollow fiber membranes were found to have significantly improved anti-plasma leakage properties as compared with the uncoated hollow fiber membranes.

Example 2

Polydimethylsiloxane (PDMS, SYLGARD (registered trademark) 184) was dissolved in n-hexane (surface tension: 18.4 dyn/cm) to prepare a coating solution having a PDMS concentration of 20 mg/mL. An operation similar to Reference Example 1 was performed except that 40 mL/m² per membrane area of the coating solution was allowed to pass through lumina of hollow fiber membranes 51. The hollow fiber membranes 51 were left to stand in an oven at 60° C. for 12 hours to dry the solvent remaining in the lumina of the hollow fiber membranes 51. Defining the passage of the solution and drying as one cycle, another cycle was repeated (that is, a total of two cycles were performed) to obtain coated hollow fiber membranes having a coating layer.

Gas permeability and anti-plasma leakage properties of the coated hollow fiber membranes obtained in Example 2 were evaluated in a similar manner to the above evaluations.

Similarly to the coated hollow fiber membranes of Example 1, the coated hollow fiber membranes of Example 2 were found to be lower in gas permeability than the uncoated hollow fiber membranes but have sufficient gas permeability required for an oxygenator (1.0 mL/m²·min·mmHg or more).

In addition, the coated hollow fiber membranes of Example 2 were found to have significantly improved anti-plasma leakage properties as compared with the uncoated hollow fiber membranes, similarly to the coated hollow fiber membranes of Example 1.

What is claimed is:

1. A method for manufacturing an oxygenator having a plurality of porous hollow fiber membranes for gas exchange, the method comprising the steps of:
    dissolving a silicone compound in an organic solvent having a surface tension of less than 70 dyn/cm to prepare a coating solution; and
    bringing an inner surface of the hollow fiber membranes into contact with the coating solution under a negative pressure of 50 hPa or more and 150 hPa or less to form a silicone compound-containing coating layer on the inner surface.

2. The method according to claim 1, wherein the organic solvent is at least one selected from the group consisting of n-hexane, cyclohexane, acetone, butyl alcohol, 1-propanol, isopropanol, chloroform, diethyl ether, aromatic hydrocarbon, and fluorine-based solvent.

3. The method according to claim 1, wherein the hollow fiber membranes are comprised of polypropylene or polymethylpentene.

4. The method according to claim 1, further comprising the step of:
    forming an antithrombotic polymer compound-containing coat on an outer surface of the hollow fiber membranes.

5. The method according to claim 1, wherein the silicone compound is represented by a Formula (1):

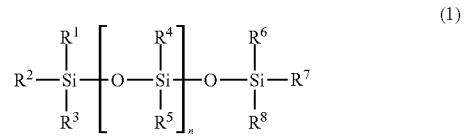

wherein $R^1$ to $R^8$ are each independently a $C_{1-6}$ alkyl group, a $C_{6-30}$ aromatic hydrocarbon group, or a reactive group selected from the group consisting of ethylenically unsaturated bond, amino group, hydroxy group, carboxy group, maleimide group, thiol group, and halogen group; and
wherein n is 1 or more and 100,000 or less.

6. A method for manufacturing an oxygenator having a plurality of porous hollow fiber membranes for gas exchange, the method comprising the steps of:
    dissolving a silicone compound in an organic solvent having a surface tension of less than 70 dyn/cm to prepare a coating solution;
    exposing an inner surface of the hollow fiber membranes to the coating solution under a negative pressure of 50 hPa or more and 150 hPa or less; and
    drying the organic solvent;
    wherein the exposing and drying steps are sequentially repeated a plurality of times to form a silicone compound-containing coating layer on the inner surface.

7. The method according to claim 6, wherein the organic solvent is at least one selected from the group consisting of n-hexane, cyclohexane, acetone, butyl alcohol, 1-propanol, isopropanol, chloroform, diethyl ether, aromatic hydrocarbon, and fluorine-based solvent.

8. The method according to claim 6, wherein the hollow fiber membranes are comprised of polypropylene or polymethylpentene.

9. The method according to claim 6, further comprising the step of:
    forming an antithrombotic polymer compound-containing coat on an outer surface of the hollow fiber membranes.

10. The method according to claim 6, wherein the silicone compound is represented by a Formula (1):

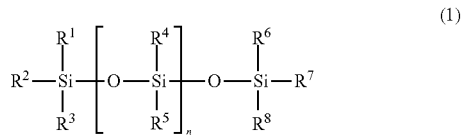

wherein $R^1$ to $R^8$ are each independently a $C_{1-6}$ alkyl group, a $C_{6-30}$ aromatic hydrocarbon group, or a reactive group selected from the group consisting of ethylenically unsaturated bond, amino group, hydroxy group, carboxy group, maleimide group, thiol group, and halogen group; and
wherein n is 1 or more and 100,000 or less.

* * * * *